United States Patent
Suesada et al.

(10) Patent No.: US 9,527,372 B2
(45) Date of Patent: Dec. 27, 2016

(54) VEHICLE BODY STRUCTURE HAVING DETACHABLE ROOF

(71) Applicant: HONDA MOTOR CO., LTD., Tokyo (JP)

(72) Inventors: Ryo Suesada, Wako (JP); Masaki Soda, Wako (JP); Takeshi Ishikawa, Wako (JP); Yuujiro Tashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/872,296

(22) Filed: Oct. 1, 2015

(65) Prior Publication Data

US 2016/0101677 A1   Apr. 14, 2016

(30) Foreign Application Priority Data

Oct. 2, 2014  (JP) ................................ 2014-204221

(51) Int. Cl.
  *B60J 7/10* (2006.01)
  *B60J 10/10* (2006.01)

(52) U.S. Cl.
  CPC ........ *B60J 7/10* (2013.01); *B60J 10/10* (2013.01); *B60J 10/90* (2016.02)

(58) Field of Classification Search
  CPC ............... B60J 7/10; B60J 10/10; B60J 10/82; B60J 10/90
  USPC ............... 296/219, 216; 49/498.1, 484.1
  See application file for complete search history.

(56) References Cited

U.S. PATENT DOCUMENTS

| | | | | |
|---|---|---|---|---|
| 4,783,116 A | * | 11/1988 | Hough | B60R 13/0206 296/216.07 |
| 6,186,586 B1 | * | 2/2001 | Lindinger | E05F 15/443 296/214 |
| 7,506,917 B2 | * | 3/2009 | Essig | B60J 7/102 296/121 |

FOREIGN PATENT DOCUMENTS

| | | |
|---|---|---|
| JP | 07-101251 A | 4/1995 |
| JP | 11-321481 A | 11/1999 |
| JP | 2014-008878 A | 1/2014 |
| JP | 5478673 B2 | 4/2014 |

OTHER PUBLICATIONS

Office Action dated Aug. 12, 2016, issued in counterpart Japanese Patent Application No. 2014-204221, with English translation. (6 pages).

\* cited by examiner

*Primary Examiner* — Dennis H Pedder
(74) *Attorney, Agent, or Firm* — Westerman, Hattori, Daniels & Adrian, LLP

(57) ABSTRACT

A vehicle body structure having a detachable roof, in which a front seal member is provided in a roof opening, and the front seal member is in contact with a press end of a soft top. The front seal member includes a first stopper member provided adjacent to a first seal member and a second stopper member provided adjacent to a second seal member. The press end is in contact with both the first stopper member and the second stopper member in a condition that sealing is maintained by both the first seal member and the second seal member.

15 Claims, 16 Drawing Sheets

VEHICLE BODY STRUCTURE HAVING DETACHABLE ROOF

CROSS REFERENCES TO RELATED APPLICATIONS

The present application claims priority under 35 U.S.C. §119 to Japanese Patent Application No. 2014-204221, filed Oct. 2, 2014, entitled "Vehicle Body Structure Having Detachable Roof." The contents of this application are incorporated herein by reference in their entirety.

TECHNICAL FIELD

The present disclosure relates to a vehicle body structure having a detachable roof, in which a roof of a vehicle body is provided with a roof opening, a soft top is detachably provided in the roof opening, and the soft top covers the roof opening.

BACKGROUND

As a vehicle body structure having a detachable roof, the following vehicle body structure is known: with a detachable roof (hereinafter referred to as a soft top) detachably attached to a roof opening of a vehicle body, an end of the soft top (hereinafter referred to as a press end) is in contact with a seal member of the roof opening.

Specifically, in the seal member, a first seal unit and a second seal unit are disposed spaced apart in a fore-and-aft direction of the vehicle body. In addition, the press end of the soft top is provided with a lower sheet and a wire member. The lower sheet is composed of awning cloth having flexibility.

The lower sheet is pulled down by the wire member with the soft top mounted on the roof opening, and the press end of the soft top thereby comes into contact with the first and second seal units. Thus, the first and second seal units are deformed, and the press end of the soft top is thereby supported by the reaction force of each seal unit, and sealing between each seal unit and the press end of the soft top is maintained (see, for instance, Japanese Patent No. 5478673).

In a known vehicle roof structure, the roof opening of the vehicle body is provided with a molding which comes into contact with the peripheral edge of a roof glass from an upper position. Specifically, the molding is provided with a pair of weather strip parts spaced apart in a fore-and-aft direction of the vehicle body, and a stopper unit is provided between the pair of weather strip parts.

The peripheral edge of the roof glass is brought into contact with the stopper unit, and the peripheral edge is thereby supported by the stopper unit. In this state, the pair of weather strip parts is pressed and deformed by the peripheral edge of the roof glass. Here, the roof glass and a metal panel have a higher stiffness compared with the soft top. Therefore, an amount of flexure, which occurs in a central portion of the roof glass, is reduced to a small value with the roof glass mounted on the roof opening. Consequently, it is possible to dispose the peripheral edge of the roof glass in a substantially horizontal position in the vicinity of the stopper unit, and thus sealing between each weather strip part and the peripheral edge of the roof glass is maintained by the reaction force of the pair of weather strip parts (see, for instance, Japanese Unexamined Patent Application Publication (JP-A) No. 07-101251).

SUMMARY

Here, in the vehicle body structure having a detachable roof disclosed in Japanese Patent No. 5478673, the first and second seal units are deformed, and the press end of the soft top is thereby supported by the reaction force of each seal unit. Therefore, for instance, when the mounting position of the soft top or the tension direction due to a wire member is deviated, the reaction force of the first and second seal units may be changed and thus the slope of the press end of the soft top may be changed.

For this reason, there is a need to devise a method of securing sealing between the first seal unit and the press end of the soft top and sealing between the second seal unit and the press end of the soft top (that is, sealing between the seal member and the press end of the soft top).

Also, in the roof structure disclosed in JP-A No. 07-101251, the peripheral edge of a roof glass is supported by one stopper unit, and thus sealing between a pair of weather strip parts and the peripheral edge of the roof glass is maintained. However, the roof structure of JP-A No. 07-101251 is provided with only one stopper unit. Therefore, when the press end of the soft top having flexibility is supported by the one stopper unit, the press end of the soft top may be displaced in an inclined manner with the stopper unit serving as a fulcrum.

Therefore, it is difficult to ensure the sealing between the pair of weather strip parts (that is, the seal member) and the press end of the soft top.

The present disclosure provides, for example, a vehicle body structure having a detachable roof, that is capable of securing sealing between a seal member and a soft top.

A first aspect of the disclosure provides a vehicle body structure having a detachable roof, including: a roof opening provided in a roof of a vehicle body; a soft top that is detachably provided in the roof opening and that covers the roof opening; and a seal member that is provided in the roof opening and in contact with a press end of the soft top, the seal member includes a first seal unit and a second seal unit that are disposed spaced apart horizontally and that maintain sealing with respect to the press end of the soft top by being pressed by the press end, a first stopper unit provided adjacent to the first seal unit and a second stopper unit provided adjacent to the second seal unit. The second seal unit is disposed more inwardly of the roof opening than the first seal unit is, and in a condition that sealing is maintained by both the first seal unit and the second seal unit, the press end of the soft top is in contact with both the first stopper unit and the second stopper unit. Thus, even when flexure occurs in a central portion of the soft top, stable support of the press end at two locations of the first stopper unit and the second stopper unit protects the press end from being displaced in an inclined manner. By protecting the press end from being inclined, it is possible to reduce deviation of the press end with respect to the first seal unit and the second seal unit. This makes it possible to secure sealing between the first seal unit and the press end and to secure sealing between the second seal unit and the press end. That is, it is possible to secure sealing between the seal member and the press end. Therefore, support of the press end by the first stopper unit and the second stopper unit protects the press end from flexure in the first seal unit and the second seal unit. This makes it possible to further secure sealing between the first seal unit, the second seal unit (that is, the seal member) and the front press end.

A second aspect of the disclosure provides the vehicle body structure having a detachable roof according to the first aspect, in which an edge of the press end is brought into contact with the first seal unit substantially horizontally from a rear position, the press end is brought into contact with the second seal unit in a vertical direction, and the second stopper unit is disposed over than the first stopper unit. Therefore, due to the weight of the soft top itself and the tension of the wire member, the edge of the press end is preferably moved (pulled) to the first seal unit. This makes it possible to reliably secure sealing between the first seal unit and the edge of the press end.

A third aspect of the disclosure provides the vehicle body structure having a detachable roof according to the second aspect, in which an upper surface of at least one of the first stopper unit and the second stopper unit is inclined downward toward an outside of the roof opening. Therefore, due to the weight of the soft top itself and the tension of the wire member, the edge of the press end is further preferably moved to the first seal unit. This makes it possible to further reliably secure sealing between the first seal unit and the edge of the press end.

A fourth aspect of the disclosure provides the vehicle body structure having a detachable roof according to the third aspect, in which an upper surface of the first stopper unit and an upper surface of the second stopper unit are coplanar. Thus, the upper surfaces of the first stopper unit and the second stopper unit may be inclined downward toward the outside of the roof opening. Thus, it is possible to further smoothly move the edge of the press end to the first seal unit by the weight of the soft top and the tension of the wire member. This makes it possible to further reliably secure sealing between the first seal unit and the edge of the press end.

A fifth aspect of the disclosure provides the vehicle body structure having a detachable roof according to any one of the first to fourth aspects, in which the roof opening has a flange at an inner end, the flange extending in a vertical direction, the seal member includes a retainer supported by the flange, and the second stopper unit is connected to the retainer. This enables the flange to support the load that is applied from the soft top to the second stopper unit, and thus the second stopper unit is able to support the soft top reliably.

A sixth aspect of the disclosure provides the vehicle body structure having a detachable roof according to the fifth aspect, in which the retainer includes: an outer wall provided near the first seal unit, an inner wall provided more inwardly of the roof opening than the outer wall, and a top portion that connects an upper end of the outer wall and an upper end of the inner wall and that is connected to the second stopper unit, and the outer wall, the inner wall, and the top portion are formed in a groove shape that allows the flange to be inserted. This enables the flange to support the load that is applied from the soft top to the second stopper unit, and thus the second stopper unit is able to support the soft top further reliably.

A seventh aspect of the disclosure provides the vehicle body structure having a detachable roof according to any one of the first to sixth aspects, in which the soft top includes a sheet that has flexibility and covers the roof opening and a reinforcement member that is provided at an end of the sheet and is composed of a material having higher stiffness than the sheet, the end of the sheet and the reinforcement member constitute the press end of the soft top, and the reinforcement member is in contact with the first stopper unit and the second stopper unit. Thus, it is possible to stably support the reinforcement member at two positions of the first stopper unit and the second stopper unit. This further reliably protects the press end from being displaced in an inclined manner, and it is possible to further reliably secure sealing between the seal member and the press end.

An eighth aspect of the disclosure provides the vehicle body structure having a detachable roof according to the seventh aspect, in which the soft top includes a wire member that is connected to the reinforcement member and that presses down the reinforcement member, and the wire member is provided between the first stopper unit and the second stopper unit in a horizontal direction perpendicular to an extension direction of the wire member. Thus, it is possible to reduce the distance dimension between the first seal unit and the wire member and the distance dimension between the second seal unit and the wire member. This enables the pressing force of the wire member to be efficiently transmitted from the reinforcement member to both the first seal unit and the second seal unit.

For comparison purpose, it may be possible that the wire member is provided outwardly of one of the first stopper unit and the second stopper unit. In this case, the pressing force of the wire member is applied to the reinforcement member as a rotational force that rotates the reinforcement member in a direction away from the other stopper with the one stopper as a fulcrum (rotational center). For this reason, it is difficult to favorably maintain the pressing force of the reinforcement member to the other stopper.

Thus, in the eighth aspect of the disclosure, the wire member is provided between the first stopper unit and the second stopper unit. This enables the pressing force of the wire member to be efficiently transmitted from the reinforcement member to both the first seal unit and the second seal unit.

BRIEF DESCRIPTION OF THE DRAWINGS

The advantages of the disclosure will become apparent in the following description taken in conjunction with the following drawings.

DETAILED DESCRIPTION

An embodiment for carrying out the present disclosure will be described below with reference to the accompany drawings. It is to be noted that "front (Fr)", "rear (Rr)", "left (L)", and "right (R)" are based on the line of sight of a driver.

Embodiment

Figure 1:
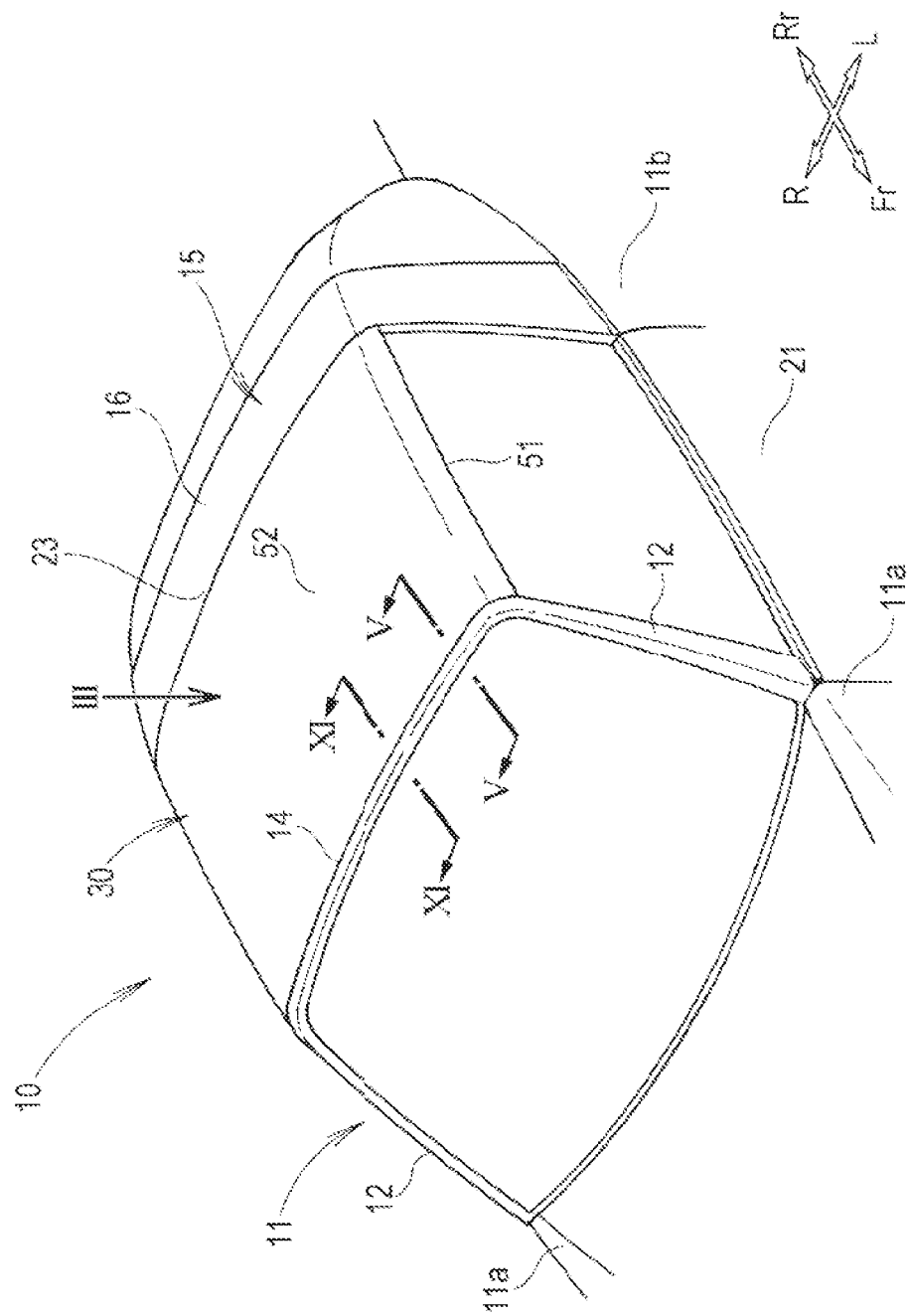
FIG. 1 is a perspective view illustrating a vehicle body structure having a detachable roof according to one embodiment of the present disclosure.
Figure 2:
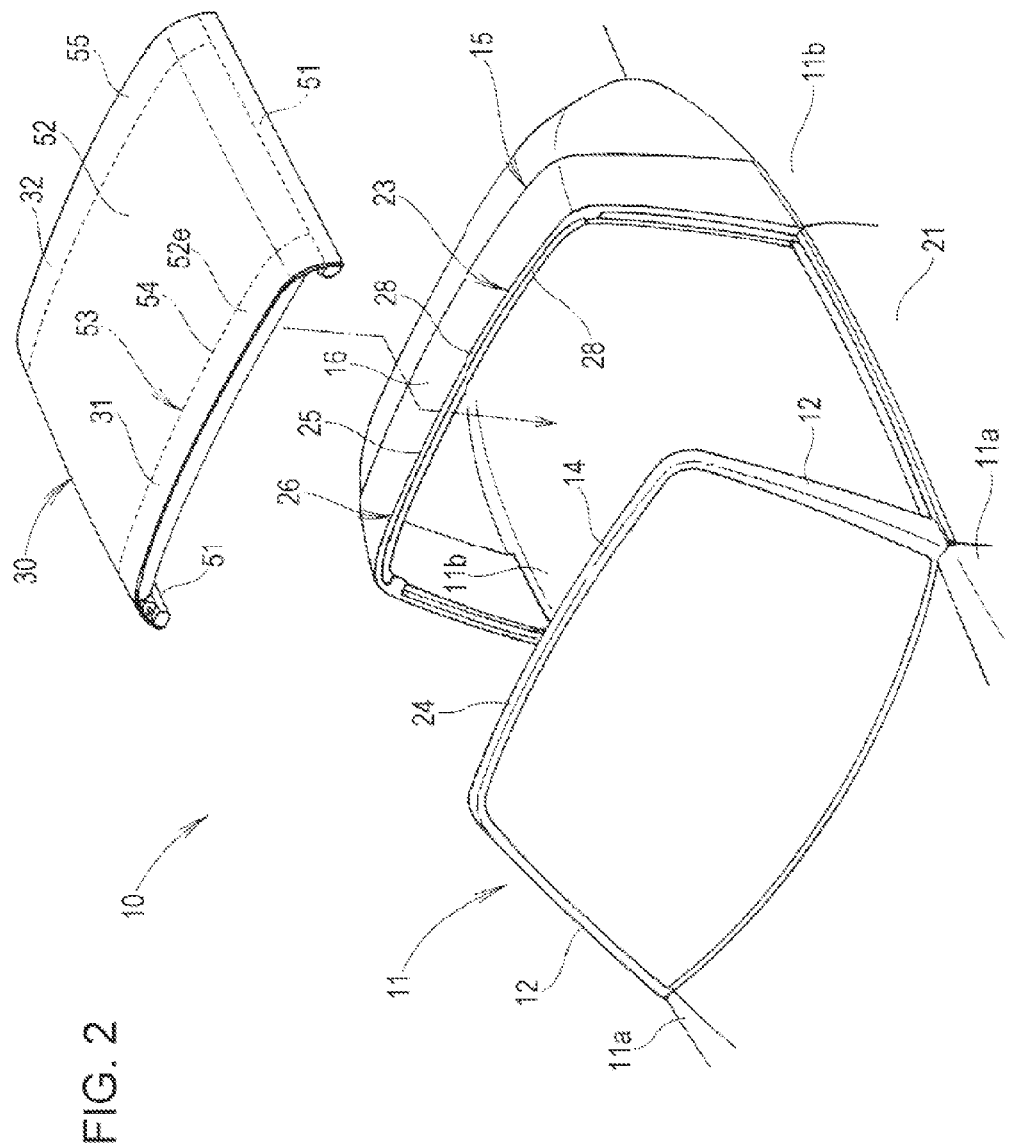
FIG. 2 is an exploded perspective view illustrating a state of the vehicle body structure having a detachable roof of FIG. 1 where the detachable roof is detached therefrom.

A vehicle body structure 10 having a detachable roof according to an embodiment will be described. In the embodiment, the detachable roof is described as a soft top 30. As illustrated in FIG. 1, FIG. 2, the vehicle body structure 10 having a detachable roof includes right and left front pillars 12 that extend from front both sides 11a of a vehicle body 11 to the rear of the vehicle body in an inclined manner, a front roof rail 14 that is bridged between the right and left front pillars 12, a roll bar 15 provided in rear both sides 11b of the vehicle body 11, a left side door 21 provided between the left front pillar 12 and the roll bar 15, and a right side door 21 provided between the right front pillar 12 and the roll bar 15 (see FIG. 3).

In addition, the vehicle body structure 10 having a detachable roof includes a roof opening 23 formed by the front roof rail 14 and a real roof rail 16 of the roll bar 15, a seal device 26 provided in the roof opening 23, and a soft top 30 detachably provided in the roof opening 23.

The front roof rail 14 and the rear roof rail 16 are provided with a predetermined space therebetween. In this manner, the roof opening 23 is formed by the front roof rail 14 and the rear roof rail 16 in the roof of the vehicle body 11.

The roof opening 23 includes a front opening edge (opening edge) 24 formed in the front roof rail 14, and a rear opening edge (opening edge) 25 formed in the rear roof rail 16.

Figure 3:
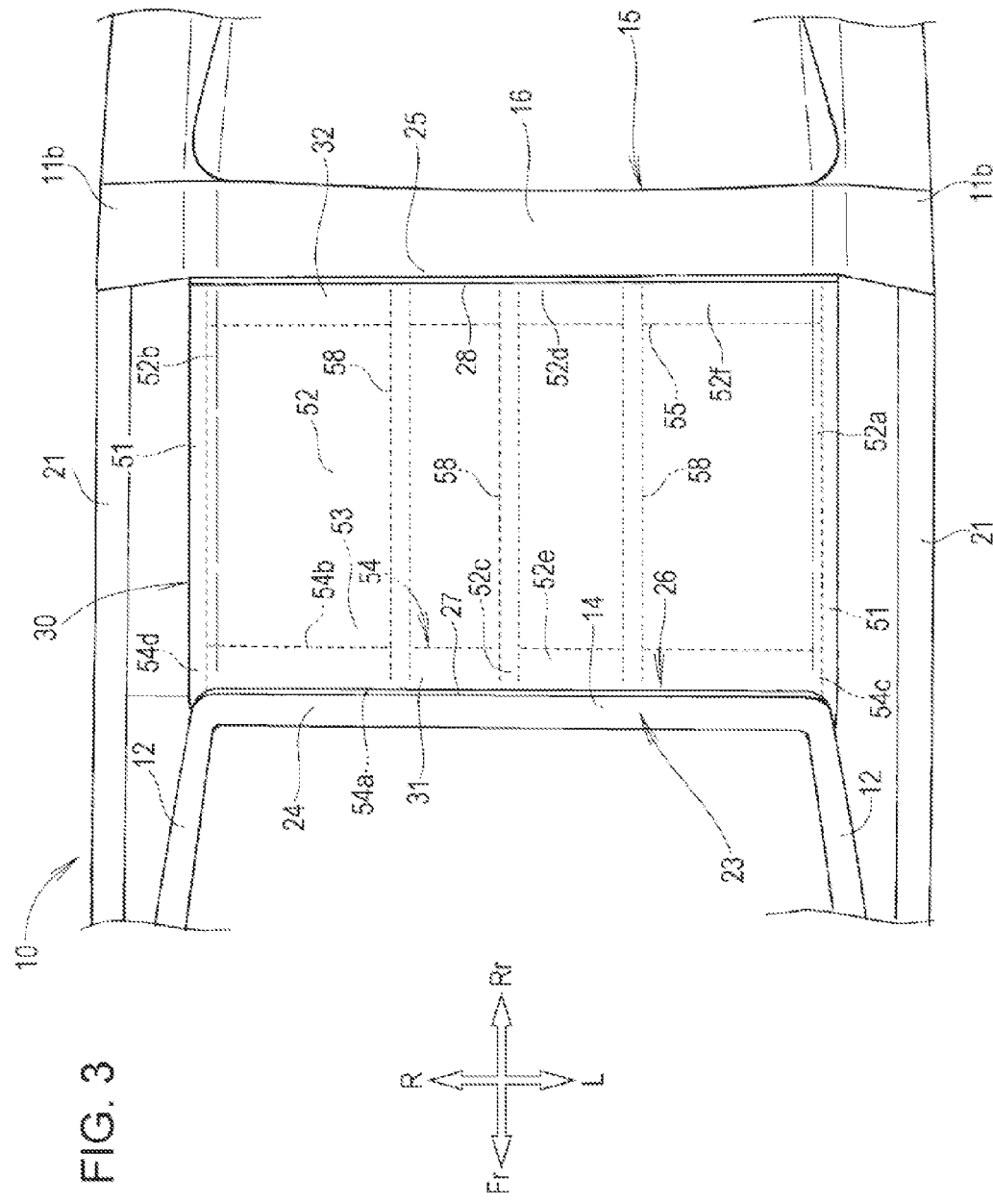
FIG. 3 is a view as seen from arrow III of FIG. 1.
Figure 4:
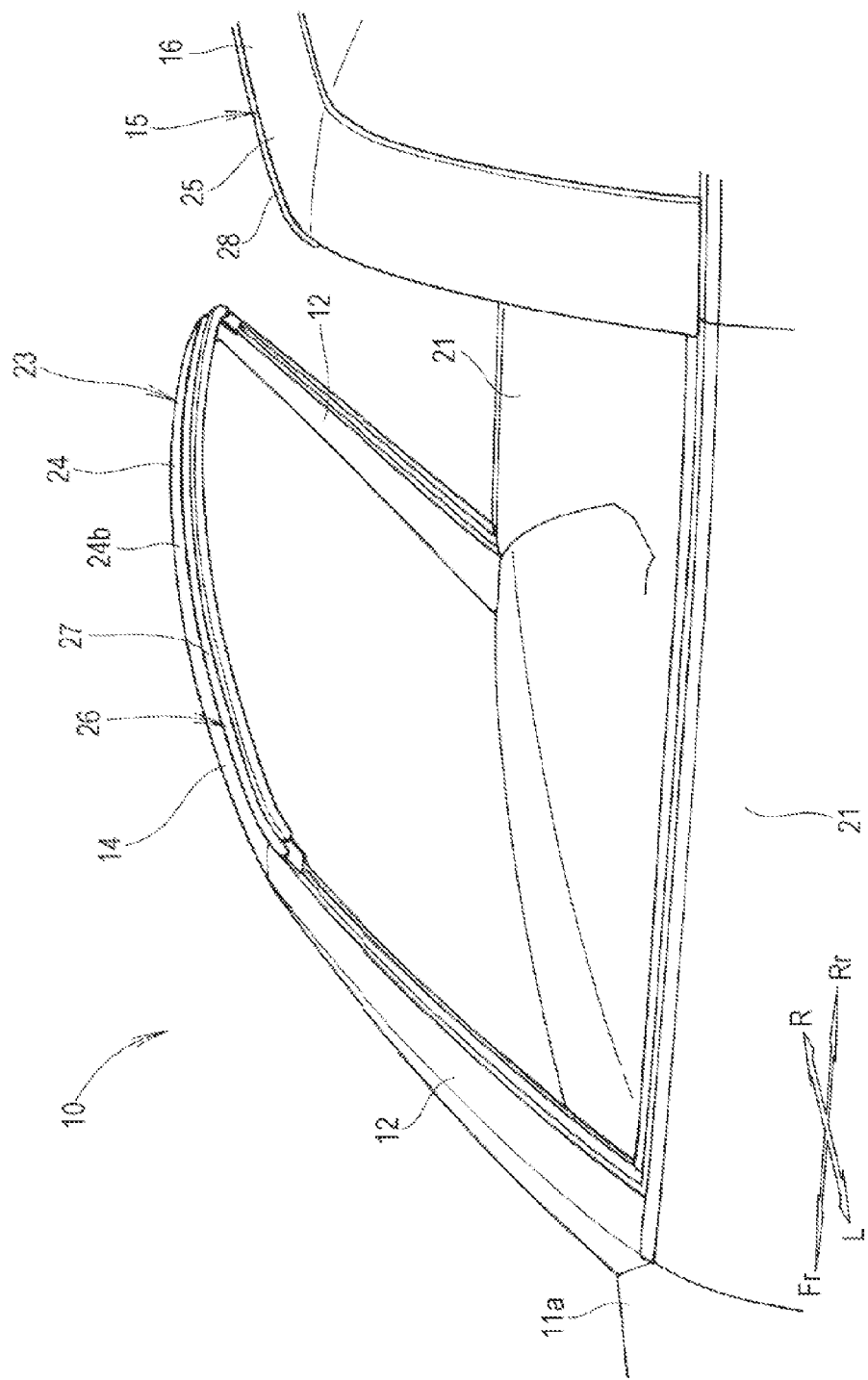
FIG. 4 is a perspective view of the vehicle body structure having a detachable roof of FIG. 2 as seen from the back of the vehicle body.

As illustrated in FIG. 3, FIG. 4, the front opening edge 24 and the rear opening edge 25 extend in a vehicle width direction, and are provided so as to be opposed to each other in a fore-and-aft direction of the vehicle body. The seal device 26 is provided in the front opening edge 24 and the rear opening edge 25 of the roof opening 23.

Figure 5:
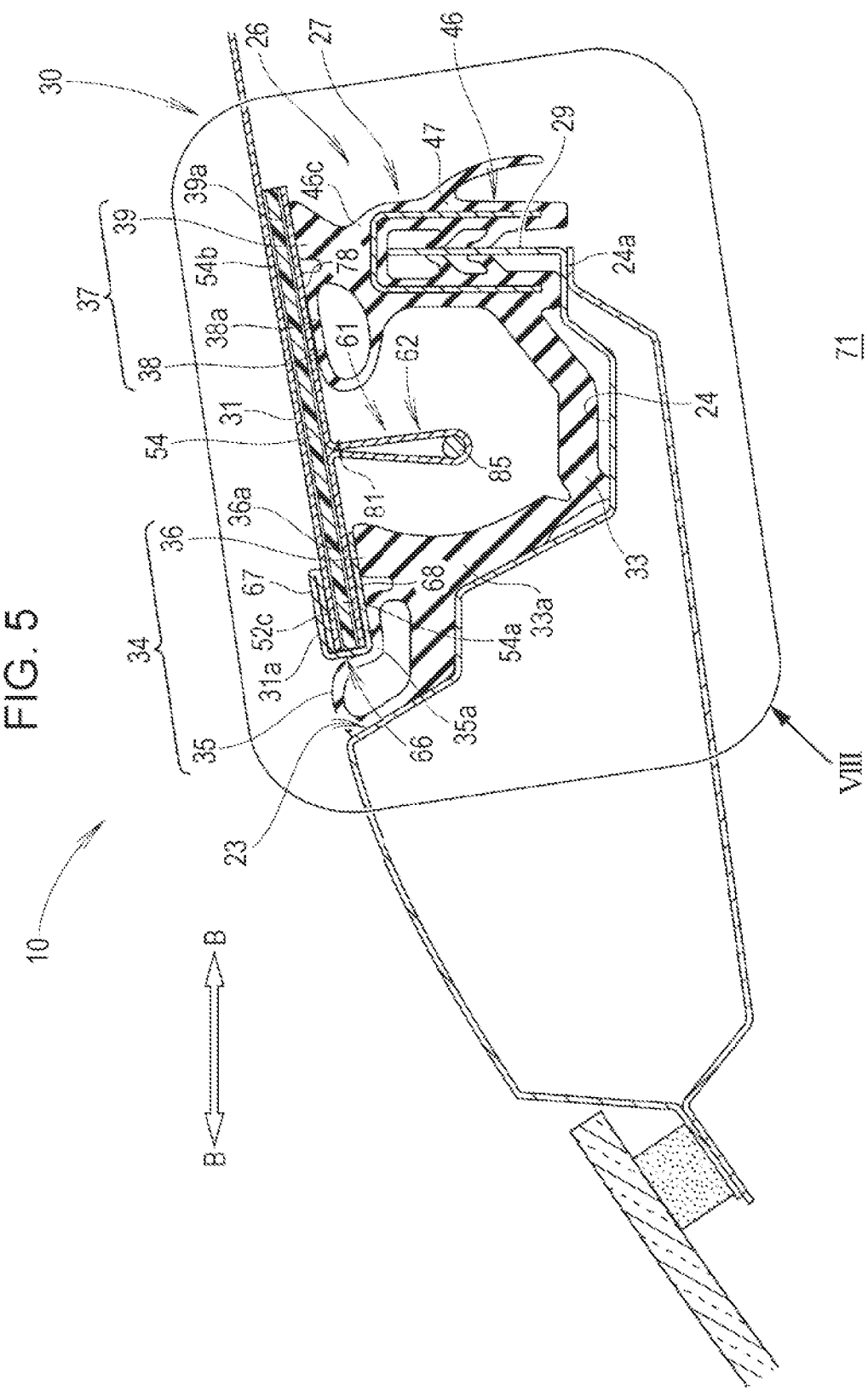
FIG. 5 is a sectional view taken along line V-V of FIG. 1.

As illustrated in FIG. 5, a flange 29 is provided in the inner end (that is, the inner end of the roof opening 23) 24a of the front opening edge 24. The flange 29 is bent so as to extend upward from the inner end 24a of the front opening edge 24.

That is, the flange 29 is provided at the inner end 24a of the front opening edge 24 so as to extend in a vertical direction. A retainer 46 of the seal device 26 is supported by the flange 29.

Returning to FIG. 3, FIG. 4, the seal device 26 includes a front seal member (seal member) 27 provided in the front opening edge 24, and a rear seal member (seal member) 28 provided in the rear opening edge 25.

The front seal member 27 is designed to secure sealing (hermeticity) with respect to a front press end (press end) 31 of the soft top 30 by coming into contact with the front press end 31. The front seal member 27 is provided along the front opening edge 24.

The rear seal member 28 is designed to secure sealing (hermeticity) with respect to a rear press end (press end) 32 of the soft top 30 by coming into contact with the rear press end 32.

It is to be noted that the rear seal member 28 is a member substantially symmetrical to the front seal member 27 in a fore-and-aft direction of the vehicle body, and thus detailed description of the rear seal member 28 is omitted in the following.

Figure 6:
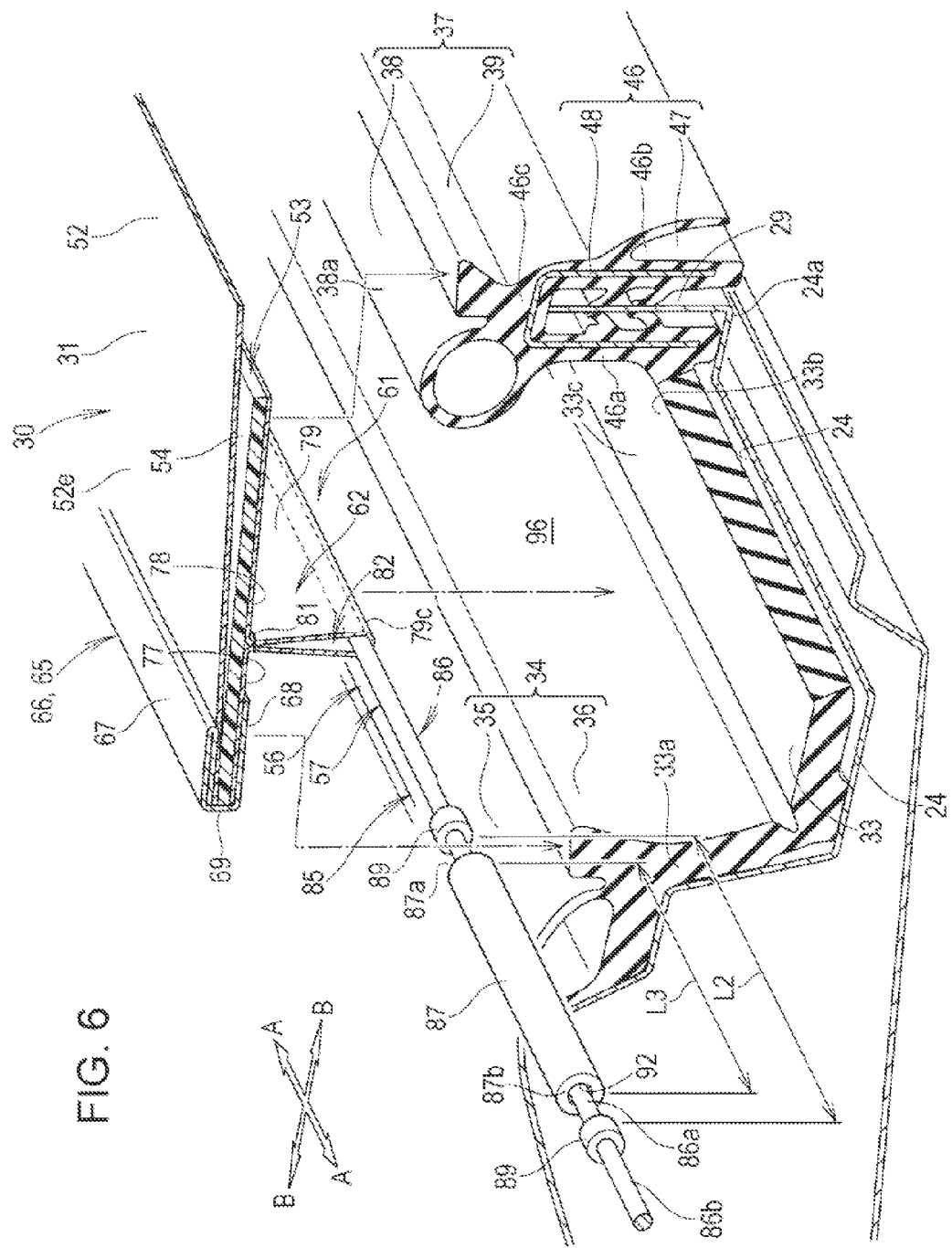
FIG. 6 is an exploded perspective view illustrating the relationship between the front seal member and the soft top of FIG. 5.

As illustrated in FIG. 5, FIG. 6, the front seal member 27 includes a base part 33 mounted on the front opening edge 24, a first seal device 34 provided in a front vehicle body upper portion 33a with respect to the base part 33, the retainer 46 provided in a rear vehicle body portion 33b with respect to the base part 33, and a second seal device 37 provided in the retainer 46.

The front seal member 27 is formed to have a substantially U-shaped section due to an opening which is formed between the first seal device 34 and the second seal device 37 and dented downward.

The first seal device 34 and the second seal device 37 are disposed spaced apart from each other in a horizontal direction perpendicular to the extension direction of a front wire member 85 (which will be described later) of the soft top 30. The extension direction of the front wire member 85 is indicated by arrow A-A (that is, a vehicle width direction), and the horizontal direction perpendicular to the extension direction of the front wire member 85 is indicated by arrow B-B (that is, a fore-and-aft direction of the vehicle body). The base part 33 is disposed between the base of the first seal device 34 and the base of the second seal device 37, and the bases of the first seal device 34 and the second seal device 37 are integrally connected via the base part 33.

The base of the first seal device 34 is bonded to the front opening edge 24 by a double-sided tape.

Figure 7:
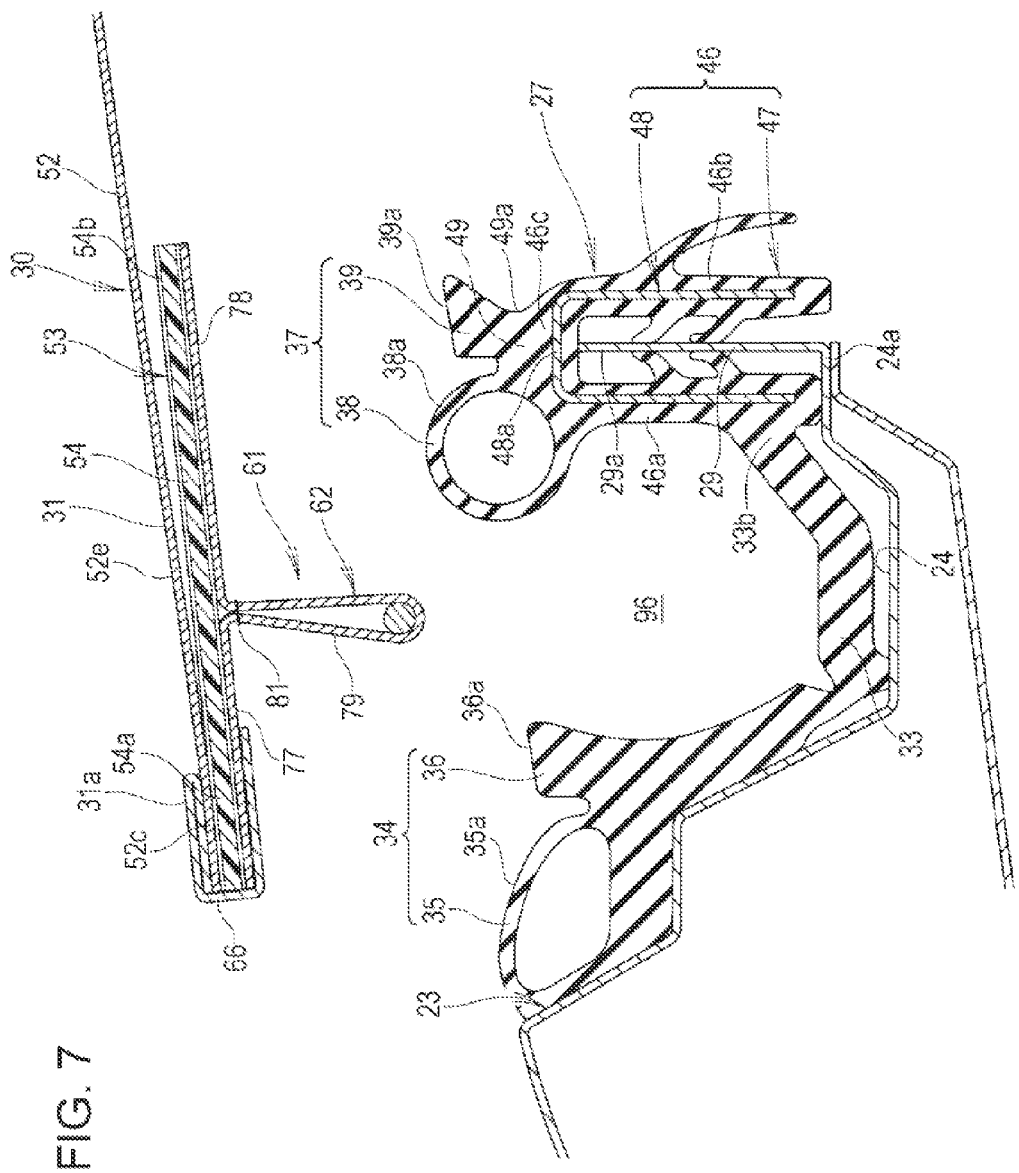
FIG. 7 is a sectional view illustrating a state where the soft top is separated upward from the front seal member of FIG. 5.

As illustrated in FIG. 5, FIG. 7, the first seal device 34 is provided at the front end of the base part 33. The first seal device 34 includes a first seal unit 35 that maintains sealing with respect to the soft top 30, and a first stopper unit 36 adjacently provided rearward of the first seal unit 35.

The first seal unit 35 is adjacently provided forward of the first stopper unit 36. The first seal unit 35 is formed in a hollow shape, and its upper portion 35a is provided at a position higher than an upper surface 36a of the first stopper unit 36. A front edge (edge) 31a of the soft top 30 (specifically, the front press end 31) is brought into contact with the upper portion 35a of the first seal unit 35 substantially in a horizontal direction from the rear and is pressed, and the upper portion 35a is thereby deformed forward and downward and sealing with respect to the front edge 31a of the soft top 30 is maintained.

The first stopper unit 36 is adjacently provided rearward of the first seal unit 35 and has the upper surface 36a disposed below the first seal unit 35 (particularly, the upper portion 35a). The upper surface 36a of the first stopper unit 36 is inclined downward toward the outside (that is, forward direction of the vehicle body) of the roof opening 23, and is formed flat along the front edge 31a of the soft top 30.

The front edge 31a of the soft top 30 is brought into contact with the upper surface 36a of the first stopper unit 36 substantially in a horizontal direction from the rear, and is supported by the upper surface 36a at a predetermined height position.

A top portion 46c of the retainer 46 is provided with the second seal device 37. The second seal device 37 includes a second seal unit 38 that maintains sealing with respect to soft top 30, and a second stopper unit 39 adjacently provided rearward of the second seal unit 38.

The second seal unit 38 is provided inwardly (that is, rear side of the vehicle body) of the roof opening 23 with respect to the first seal unit 35, and adjacently provided forwardly of the second stopper unit 39. Similarly to the first seal unit 35, the second seal unit 38 is formed in a hollow shape, and its upper portion 38a is provided at a position higher than an upper surface 39a of the second stopper unit 39.

The front press end 31 of the soft top 30 is brought into contact with the upper portion 38a of the second seal unit 38 in a vertical direction and is pressed, and the upper portion 38a is thereby deformed downward and sealing with respect to the front press end of the soft top 30 is maintained.

The second stopper unit 39 is adjacently provided rearward of the second seal unit 38. The second stopper unit 39 has the upper surface 39a that is disposed at a position lower than the second seal unit 38 (specifically, the upper portion 38a) and higher than the first stopper unit 36.

The upper surface 39a of the second stopper unit 39 is inclined downward toward the outside of the roof opening 23, and is formed flat along the front press end 31 of the soft top 30.

The front press end 31 of the soft top 30 is brought into contact with the upper surface 39a of the second stopper unit 39 from an upper position, and is supported by the upper surface 39a at a predetermined height position.

In this manner, the front edge 31a of the soft top 30 is brought into contact with the flat upper surface 36a of the first stopper unit 36, and the front press end 31 is brought into contact with the flat upper surface 39a of the second stopper unit 39. Therefore, due to the weight of the soft top 30 itself and the tension of the front wire member 85, the front press end 31 is stably supported by both the first stopper unit 36 and the second stopper unit 39. Even when flexure occurs in the central portion of the soft top 30 in a vehicle width direction, the stable support of the front press end 31 protects the front press end 31 from being displaced in a vertically inclined manner.

Protecting the front press end 31 from inclination allows the front press end 31 to be inclined with respect to the first seal unit 35 and the second seal unit 38.

This makes it possible to secure sealing between the first seal unit 35 and the front edge 31a of the front press end 31 and to secure sealing between the second seal unit 38 and the front press end 31. That is, sealing between the front seal member 27 and the front press end 31 may be secured.

Also, the first stopper unit 36 is provided adjacent to the first seal unit 35, and the second stopper unit 39 is provided adjacent to the second seal unit 38. Therefore, support of the front press end 31 by the first stopper unit 36 and the second stopper unit 39 protects the front press end 31 from flexure in the first seal unit 35 and the second seal unit 38.

This makes it possible to further secure sealing between the first seal unit 35, the second seal unit 38 (that is, the front seal member 27) and the front press end 31.

In addition, the second seal unit 38 is disposed inwardly of the roof opening 23 with respect to the first seal unit 35, and the second stopper unit 39 is disposed at a position higher than the first stopper unit 36. Also, the second stopper unit 39 is disposed inwardly of the roof opening 23 with respect to the first seal unit 35. Therefore, due to the weight of the soft top 30 itself and the tension of the front wire member 85, the front edge 31a of the front press end 31 is preferably moved (pulled) to the first seal unit 35. This makes it possible to further secure sealing between the first seal unit 35 and the front edge 31a of the front press end 31.

Here, the upper surface 39a of the second stopper unit 39 may be formed to be coplanar to (that is, flush with) the upper surface 36a of the first stopper unit 36 on an inclined surface. That is, the upper surface 39a of the second stopper unit 39 and the upper surface 36a of the first stopper unit 36 are inclined downward toward the outside of the roof opening 23.

Therefore, due to the weight of the soft top 30 itself and the tension of the front wire member 85, it is possible to move the front edge 31a of the front press end 31 to the first seal unit 35.

This makes it possible to further secure sealing between the first seal unit 35 and the front edge 31a of the front press end 31.

In particular, both the upper surface 39a of the second stopper unit 39 and the upper surface 36a of the first stopper unit 36 are inclined, thereby making it possible to further smoothly move the front edge 31a of the front press end 31 to the first seal unit 35.

Figure 8:
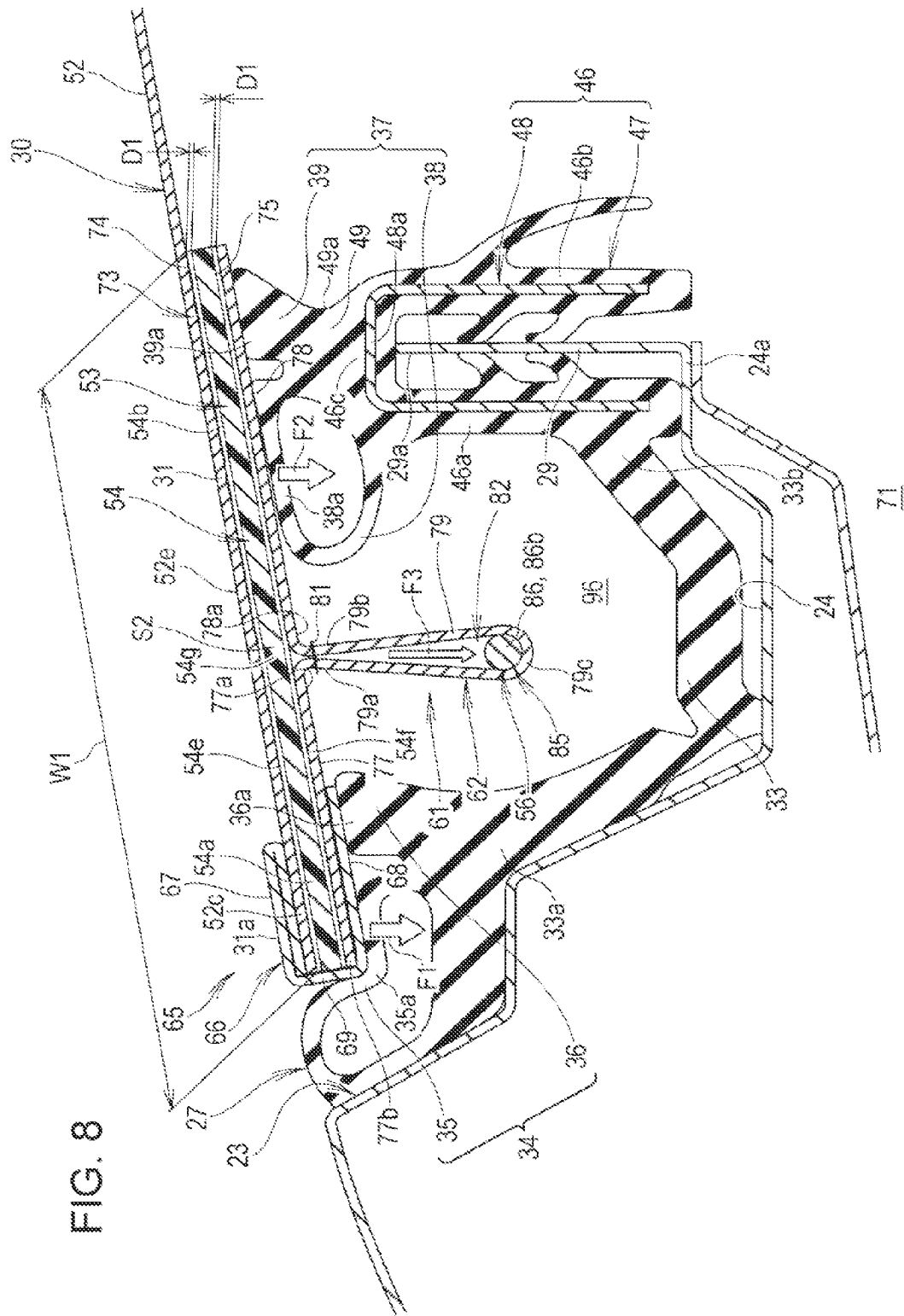
FIG. 8 is an enlarged view of portion VIII of FIG. 5.

As illustrated in FIG. 6, FIG. 8, the rear vehicle body portion 33b with respect to the base part 33 is provided with the retainer 46, which is supported by the flange 29. The retainer 46 has a rubber-made groove-shaped portion 47 connected to the second seal device 37, and a metal core material 48 that is installed inside the groove-shaped portion 47.

The retainer 46 has an outer wall 46a provided near the first seal device 34, an inner wall 46b provided inwardly of the roof opening 23 with respect to the outer wall 46a, and a top portion 46c that connects the upper end of the outer wall 46a and the upper end of the inner wall 46b.

The retainer 46 is formed to have a downward groove-shaped (substantially U-shaped) section with the outer wall 46a, the inner wall 46b, and the top portion 46c, and the lower end is opened. The flange 29 is inserted into the inside of the retainer 46 through the opening of the lower end, and the retainer 46 is thereby supported by the flange 29.

The lower portion of the second seal unit 38 and the lower portion of the second stopper unit 39 are connected to the top portion 46c of the retainer 46. Consequently, the second stopper unit 39 is disposed over the flange 29. This enables the flange 29 to support the load that is applied from the soft top 30 to the second stopper unit 39, and thus the second stopper unit 39 is able to support the soft top 30 reliably.

Also, insertion of the flange 29 upward through the opening of the retainer 46 allows a distal end 29a of the flange 29 to come into contact with the top portion 46c of the retainer 46 from a lower position.

This enables the flange 29 to support the load that is applied from the soft top 30 to the second stopper unit 39, and thus the second stopper unit 39 is able to support the soft top 30 further reliably.

The top portion 46c and the second stopper unit 39 are connected by a stopper connection portion 49. A depressed portion 49a is formed at a rear side portion of the stopper connection portion 49 and above a top portion 48a of the core material 48. The formation of the depressed portion 49a on the stopper connection portion 49 allows an upper portion of the top portion 46c (specifically, the top portion 48a of the core material 48) to be depressed forward.

Therefore, it is possible to preferably reduce the stiffness of the top portion 46c. This enables the inner wall 46b to expand rearward easily, and thus mountability of the flange 29 to the retainer 46 is improved.

Returning to FIG. 1, FIG. 2, the soft top 30 is detachably provided in the roof opening 23. When the soft top 30 is mounted on the roof opening 23, the roof opening 23 is covered by the soft top 30. On the other hand, when the soft top 30 is removed from the roof opening 23, the roof opening 23 is set in an open state. That is, the soft top 30 is a detachable roof having flexibility that is configured to be detachably attached to the roof opening 23.

As illustrated in FIG. 2, FIG. 6, the soft top 30 includes right and left side rails (mounting members) 51 that form the right and left frame portions of the soft top 30, a sheet 52 to which the right and left side rails 51 are mounted, a reinforcement device 53 that reinforces the sheet 52, a press device 56 that presses the sheet 52 downward, a connection device 61 that connects the press device 56 to the reinforcement device 53, and a piping edge device 65 that covers the sheet 52 and the reinforcement device 53.

The soft top 30 is formed such that the front press end 31 is curved forward along the front opening edge 24 (see FIG. 3). The front press end 31 is formed by a front portion (end) 52e of the sheet 52, a front reinforcement member 54 of the reinforcement device 53, a front bond portion 77 and a rear bond portion 78 of the connection device 61, and a front piping edge 66 of the piping edge device 65.

The left side rail 51 is detachably mounted (bridged) between the left end of the front roof rail 14 and the left end of the rear roof rail 16. Similarly, the right side rail 51 is detachably mounted (bridged) between the right end of the front roof rail 14 and the right end of the rear roof rail 16.

Thus, the soft top 30 is detachably mounted on the roof opening 23. The left lateral side of the sheet 52 is provided at the left side rail 51, and the right lateral side of the sheet 52 is provided at the right side rail 51. The sheet 52 is an awning cloth having flexibility and is formed to have a substantially rectangular-shape in a plan view.

Figure 9:
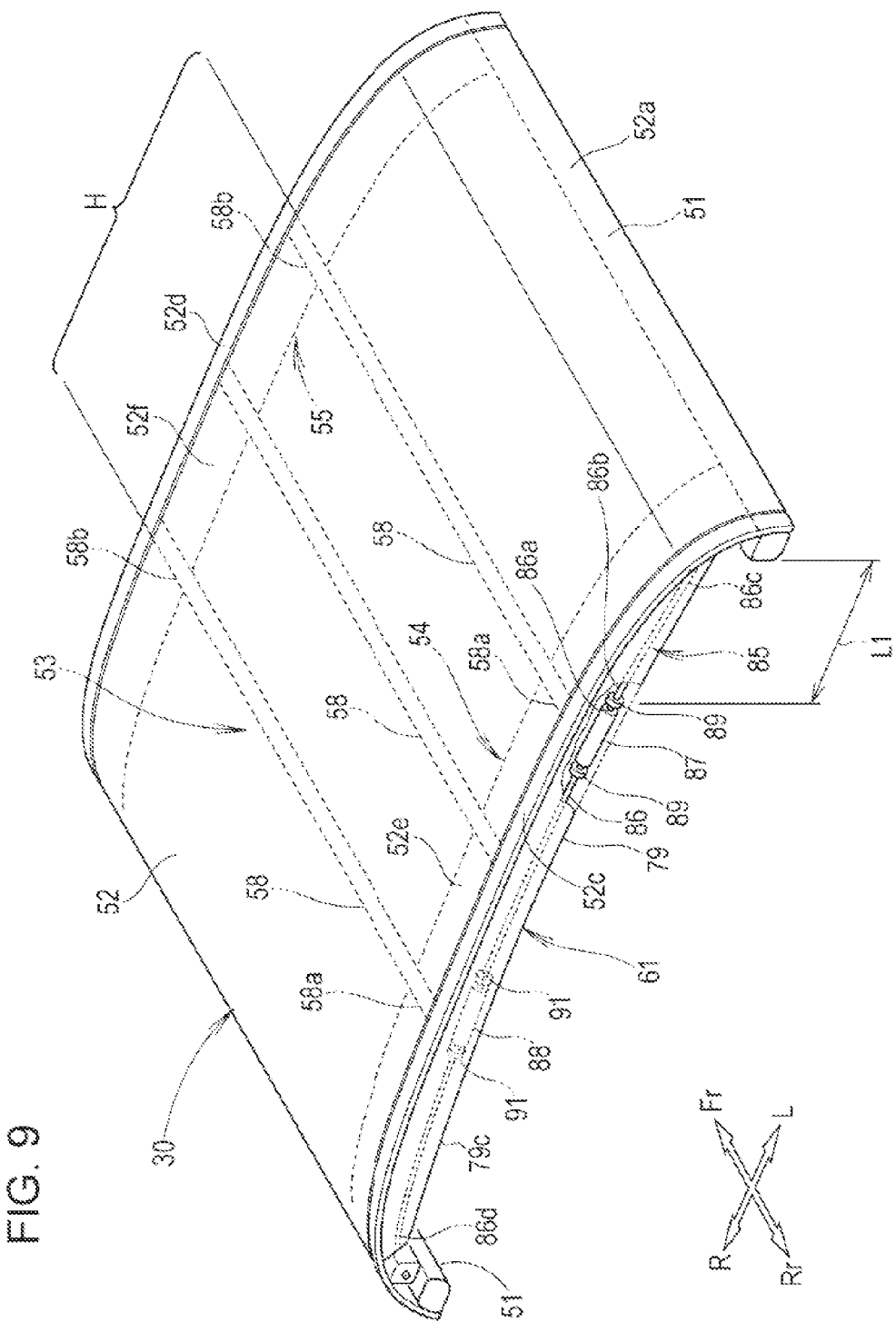
FIG. 9 is a perspective view illustrating the soft top of FIG. 2.

Specifically, as illustrated in FIG. 3, FIG. 9, the sheet 52 has a left edge 52a provided at the left side rail 51, a right edge 52b provided at the right side rail 51, a front edge 52c that is formed to be installable along the front opening edge 24, and a rear edge 52d that is formed to be installable along the rear opening edge 25.

The sheet 52 is formed to have a substantially rectangular-shape in a plan view by the left edge 52a, the right edge 52b, the front edge 52c, and the rear edge 52d, and the roof opening 23 is covered by the rectangular-shaped sheet 52 from an upper position. The upper surface of the sheet 52 is exposed above the roof opening 23 in a condition that the roof opening 23 is covered by the sheet 52.

The reinforcement device 53 is boned to the front portion 52e and a rear portion (end) 52f of the sheet 52.

The reinforcement device 53 includes a front reinforcement member (reinforcement member) 54 that is provided in the front portion 52e of the sheet 52 to reinforce the front portion 52e, a rear reinforcement member (reinforcement member) 54 that is provided in the rear portion 52f of the sheet 52 to reinforce the rear portion 52f, and plural reinforcement bars 58 that are bridged between the front reinforcement member 54 and the rear reinforcement member 55.

The front reinforcement member 54 is formed to have a substantially rectangular-shape in a plan view by a front end (one end) 54a, a rear end (other end) 54b, a left end 54c, and a right end 54d thereof.

Figure 10:
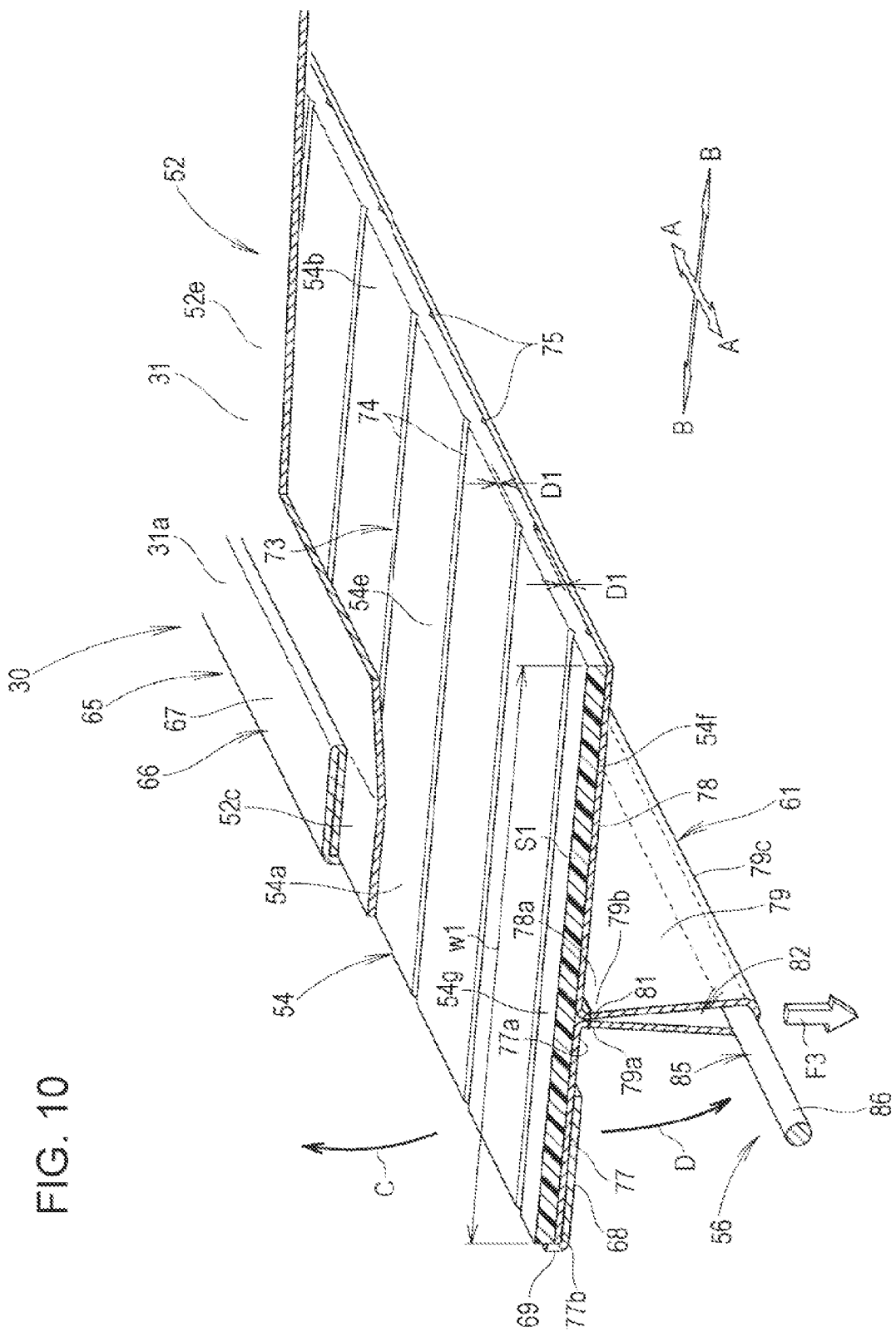
FIG. 10 is a perspective view illustrating the soft top of FIG. 6.

As illustrated in FIG. 8, FIG. 10, the front reinforcement member 54 is set to have a width dimension W1 in a fore-and-aft direction of the vehicle body, and is formed to be contactable with both the first seal device 34 and the second seal device 37 from an upper position.

The front reinforcement member 54 is disposed on the side of the sheet 52 (specifically, the front portion 52e) facing a vehicle cabin 71, and is stacked on the front portion 52e in the vehicle cabin 71. In this state, the front end 54a (specifically, the upper surface) of the front reinforcement member 54 is bonded to (sewed on) the front edge 52c of the sheet 52.

Therefore, the front portion 52e (specifically, the front edge 52c) of the sheet 52 is reinforced by the front reinforcement member 54.

The front reinforcement member 54 is formed in a plate shape with a material (for instance, a resin such as polypropylene (PP)) having higher strength than the sheet 52, and has plural grooves 73 that are provided at predetermined intervals in a vehicle width direction.

In this manner, the front reinforcement member 54 is formed with a material having higher strength than the sheet 52, and the high stiffness front reinforcement member 54 is above and in contact with both the first seal device 34 and the second seal device 37.

Therefore, the high stiffness front reinforcement member 54 is brought into contact with the first stopper unit 36 of the first seal device 34 and the second stopper unit 39 of the second seal device 37 from an upper position. This allows the front reinforcement member 54 to be stably supported at two positions of the first stopper unit 36 and the second stopper unit 39, and the front press end 31 of the soft top 30 is reliably protected from being displaced in a vertically inclined manner.

By protecting the front press end 31 from being inclined, it is possible further reliably secure sealing with respect to the front seal member 27 (that is, the first seal unit 35, the second seal unit 38).

Also, the high stiffness front reinforcement member 54 is brought into contact with the first seal unit 35 of the first seal device 34 and the second seal unit 38 of the second seal device 37 from an upper position. Thus, the high stiffness front reinforcement member 54 increases a pressing force (urging force) F1 by the front end 54a of the front reinforcement member 54 to the first seal unit 35 and a pressing force (urging force) F2 by the rear end 54b of the front reinforcement member 54 to the second seal unit 38.

Consequently, sealing between the first seal unit 35 and the front end 54a is secured, and sealing between the second seal unit 38 and the rear end 54b is secured. Therefore, sealing of the soft top 30 with respect to the first seal unit 35 and the second seal unit 38 is secured.

Also, the front reinforcement member 54 is provided with the plural grooves 73 at predetermined intervals in a vehicle width direction. The predetermined intervals between the grooves 73 are appropriately selected according to the shape of the front reinforcement member 54.

Each of the grooves 73 has an upper groove (also referred to as an upper slit) 74 formed in an upper surface 54e of the front reinforcement member 54, and a lower groove (also referred to as a lower slit) 75 formed in a lower surface 54f of the front reinforcement member 54. The upper groove 74 and the lower groove 75 are provided at vertically overlapping positions.

The upper groove 74 is formed to have a substantially V-shaped section and extends linearly along the upper surface 54e from the front end 54a of the front reinforcement member 54 to the rear end 54*b* of the front reinforcement member 54. The front end 54*a* of the front reinforcement member 54 is disposed near the first seal device 34 of the front seal member 27. Also, the rear end 54*b* of the front reinforcement member 54 is disposed near the second seal device 37 of the front seal member 27.

Therefore, the upper groove 74 extends in the direction from the first seal device 34 to the second seal device 37 of the front seal member 27.

The lower groove 75 is formed to have a substantially V-shaped section vertically symmetrical to the upper groove 74 and extends linearly along the lower surface 54*f* from the front end 54*a* of the front reinforcement member 54 to the rear end 54*b* of the front reinforcement member 54. Similarly to the upper groove 74, the lower groove 75 also extends in the direction from the first seal device 34 to the second seal device 37 of the front seal member 27.

In this manner, the upper groove 74 extends linearly along the upper surface 54*e* from the front end 54*a* of the front reinforcement member 54 to the rear end 54*b* of the front reinforcement member 54. In addition, the lower groove 75 extends linearly along the lower surface 54*f* from the front end 54*a* of the front reinforcement member 54 to the rear end 54*b* of the front reinforcement member 54. Also, the front reinforcement member 54 is composed of a resin such as polypropylene (PP). Therefore, portions (valley portions) of the front reinforcement member 54, which have the upper grooves 74 and lower grooves 75, are formed to be bendable in a thin-walled shape. Therefore, it is possible to bend the front reinforcement member 54 at each upper groove 74 and lower groove 75 in both directions of an upper direction (direction of arrow C) and a lower direction (direction of arrow D).

Bending the front reinforcement member 54 at each upper groove 74 and lower groove 75 in this manner allows the front reinforcement member 54 to be folded in a curl shape, thereby making it possible to fold the soft top 30 (see also FIG. 2) into a small size.

In addition, bending the front reinforcement member 54 at each upper groove 74 and lower groove 75 in both directions of an upper direction (direction of arrow C) and a lower direction (direction of arrow D) allows workability of folding the soft top 30 into a small size to be improved.

Also, each upper groove 74 and lower groove 75 extend in the direction from the first seal device 34 (specifically, the first stopper unit 36) to the second seal device 37 (specifically, the second stopper unit 39). In the direction from the first stopper unit 36 to the second stopper unit 39, the sectional area of the front reinforcement member 54 is set to be fixed.

Specifically, the sectional area S1 (see FIG. 10) of any portion which includes no upper groove 74 and no lower groove 75 is set to be fixed in the direction from the first stopper unit 36 to the second stopper unit 39. In addition, the sectional area S2 (see FIG. 8) of any portion which includes an upper groove 74 and a lower groove 75 is set to be fixed in the direction from the first stopper unit 36 to the second stopper unit 39. That is, the strength of the front reinforcement member 54 is set to be fixed in the direction from the first stopper unit 36 to the second stopper unit 39.

Furthermore, the first stopper unit 36 supports the front end 54*a* of the front reinforcement member 54, and the second stopper unit 39 supports the rear end 54*b* of the front reinforcement member 54. That is, both ends of the front reinforcement member 54 are supported by the first stopper unit 36 and the second stopper unit 39.

Therefore, in a condition that the front reinforcement member 54 is pressed down by a front wire member 85 (which will be described later) of the press device 56, it is possible to protect substantially middle position 54*g* of the front reinforcement member 54 from being deformed downward due to pressing force F3 of the front wire member 85. Thus, it is possible to protect the front reinforcement member 54 from being deformed downward in a curved shape due to the pressing force F3 of the front wire member 85.

In other words, by extending the upper and lower grooves 74, 75 in the direction from the first seal device 34 to the second seal device 37, it is possible to protect the front reinforcement member 54 from being deformed along the upper and lower grooves 74, 75 between the first seal device 34 and the second seal device 37 due to the pressing force of the front wire member 85.

This protection of deformation of the front reinforcement member 54 allows the pressing force F3 of the front wire member 85 to be efficiently transmitted from the front reinforcement member 54 to the first seal unit 35 and the second seal unit 38.

Thus, the pressing force F1 of the front reinforcement member 54 to the first seal unit 35 and the pressing force F2 of the front reinforcement member 54 to the second seal unit 38 are increased.

Therefore, sealing between the first seal unit 35 and the front end 54*a* of the front reinforcement member 54 is secured and sealing between the second seal unit 38 and the rear end 54*b* of the front reinforcement member 54 is secured. That is, sealing of the soft top 30 with respect to the first seal unit 35 and the second seal unit 38 is secured.

Also, corresponding upper groove 74 and lower groove 75 are provided at vertically overlapping positions. Therefore, the portions having the upper grooves 74 on the upper surface 54*e* of the front reinforcement member 54 may be reduced in number, and the portions having the lower grooves 75 on the lower surface 54*f* of the front reinforcement member 54 may be reduced in number. This protects the stiffness of the front reinforcement member 54 from reducing, and the pressing force F3 of the front wire member 85 is efficiently transmitted from the front reinforcement member 54 to the first seal device 34 (specifically, the first seal unit 35) and the second seal device 37 (specifically, the second seal unit 38).

Therefore, sealing of the soft top 30 with respect to the first seal unit 35 and the second seal unit 38 is further preferably secured.

Also, corresponding upper groove 74 and lower groove 75 are provided at vertically overlapping positions. Therefore, groove depth dimension D1 (that is, the cut depth of each upper groove 74 or each lower groove 75) of the upper groove 74 and the lower groove 75 is restricted to be small. This makes it easy to process the upper groove 74 and the lower groove 75 and productivity of the front reinforcement member 54 is improved.

In addition, by providing the front reinforcement member 54 with the upper grooves 74 and lower grooves 75 to achieve bendable front reinforcement member 54, it is possible to form the front reinforcement member 54 with a single plate material. Therefore, it is possible to save time and effort in dividing the front reinforcement member 54 into plural members and sewing the divided members on the front portion 52*e* of the sheet 52 one by one. This facilitates handling and mounting work of the front reinforcement member 54, and productivity of the front reinforcement member 54 is further improved.

As illustrated in FIG. 9, similarly to the front reinforcement member 54, the rear reinforcement member 55 is formed to have a substantially rectangular-shape in a plan view. It is to be noted that the rear reinforcement member 55 is a member substantially symmetrical to the front reinforcement member 54 in a fore-and-aft direction, and thus detailed description of the rear reinforcement member 55 is omitted in the following.

The front reinforcement member 54 and the rear reinforcement member 55 are provided with the connection device 61 (see FIG. 8, FIG. 10).

Plural reinforcement bars 58 are bridged between the front reinforcement member 54 and the rear reinforcement member 55. The reinforcement bars 58 include a central reinforcement bar 58 provided in the center in a vehicle width direction, a left reinforcement bar 58 provided left of the central reinforcement bar 58 in a vehicle width direction, and a right reinforcement bar 58 provided right of the central reinforcement bar 58 in a vehicle width direction.

The reinforcement bars 58 are provided to extend in the direction of arrow B-B in part (specifically, substantially central range H in a vehicle width direction) between the left side rail 51 and the right side rail 51. The reinforcement bars 58 are high stiffness members.

The arrow B-B has the direction intersecting with (specifically, perpendicular to) the extension direction of the front wire member 85.

With the provisions of the reinforcement bars 58, the soft top 30 is reinforced in the direction of arrow B-B by the reinforcement bars 58. Therefore, it is possible to protect the soft top 30 from bending in the direction of arrow B-B by the reinforcement bars 58. Consequently, the stiffness of the soft top 30 is ensured and stability of the soft top 30 is improved.

In addition, front ends 58a of the reinforcement bars 58 are provided at positions vertically overlapping with a front connection portion 62 of the connection device 61, and the rear ends 58b thereof are provided at positions vertically overlapping with a rear connection portion (not illustrated) of the connection device 61.

Particularly, the front ends 58a of the reinforcement bars 58 are provided at positions vertically overlapping with a connection bag 79 of the front connection portion 62. Also, the rear ends 58b of the reinforcement bars 58 are provided at positions vertically overlapping with a connection bag of the rear connection portion.

The reason for providing the front ends 58a of the reinforcement bars 58 at positions vertically overlapping with the connection bag 79 and providing the rear ends 58b of the reinforcement bars 58 at positions vertically overlapping with the connection bag will be described in detail later.

As illustrated in FIG. 8, FIG. 10, the connection device 61 includes the front connection portion 62 bonded to the lower surface 54f of the front reinforcement member 54, and the rear connection portion (not illustrated) bonded to the lower surface 54f of the rear reinforcement member 55.

The front connection portion 62 has a front bond portion 77 bonded to (sewed on) the front half of the lower surface 54f of the front reinforcement member 54, a rear bond portion 78 bonded to (sewed on) the rear half of the lower surface 54f of the rear reinforcement member 54, and the connection bag (connection portion) 79 connected to a rear end 77a of the front bond portion 77 and a front end 78a of the rear bond portion 78.

The front connection portion 62 is provided to be stacked on the front portion 52e of the sheet 52 in the vehicle cabin 71 with the front reinforcement member 54 interposed therebetween. Similarly to the sheet 52, the front connection portion 62 is composed of awning cloth having flexibility.

The front bond portion 77 is stacked on and bonded to the front half of the front reinforcement member 54 (lower surface 54f) in the vehicle cabin 71, and the front bond portion 77 is thereby mounted along the front half.

Similarly to the front edge 52c of the sheet 52 and the front end 54a of the front reinforcement member 54, the front end 77b of the front bond portion 77 is formed along the front opening edge 24.

Also, the rear bond portion 78 is stacked on and bonded to the rear half of the front reinforcement member 54 (lower surface 54f) in the vehicle cabin 71, and the rear bond portion 78 is thereby mounted along the rear half.

The connection bag 79 is formed to have a bag-shaped section by sewing a sewing portion 81 with a front upper end 79a and a rear upper end 79b stacked on each other in a fore-and-aft direction of the vehicle body. The front upper end 79a is connected to the rear end 77a of the front bond portion 77. The rear upper end 79b is connected to the front end 78a of the rear bond portion 78.

The sewed sewing portion 81 is connected to the substantially middle position 54g of the front reinforcement member 54. The substantially middle position 54g is located at substantially the middle of the front reinforcement member 54 in the direction (direction of arrow B-B) perpendicular to the extension direction (direction of arrow A-A) of the press device 56 (specifically, the front wire member 85 described later).

Thus, the connection bag 79 suspends down from the lower surface 54f at substantially the middle position 54g of the front reinforcement member 54. In this state, the connection bag 79 is supported by the lower surface 54f of the front reinforcement member 54 via the front bond portion 77 and the rear bond portion 78.

The connection bag 79 is formed to have a bag-shaped section, and space is thereby formed in an inside 82 of the connection bag 79. The inside 82 of the connection bag 79 houses the front wire member 85 of the press device 56.

That is, the front wire member 85 is connected to substantially the middle position 54g of the front reinforcement member 54 via the connection bag 79.

The rear connection portion (not illustrated) is a member substantially symmetrical to the front connection portion 62 in a fore-and-aft direction, and thus detailed description of the rear connection portion is omitted in the following.

The front edge 52c of the sheet 52, the front end 54a of the front reinforcement member 54, and the front half (including the front end 77b) of the front connection portion 62 (specifically, the front bond portion 77) are covered by the front piping edge 66 of the piping edge device 65.

In addition, the rear edge 52d of the sheet 52 illustrated in FIG. 3, the rear end of the rear reinforcement member 55, and the rear half of the rear connection portion (specifically, the rear bond portion) are covered by a rear piping edge (not illustrated) of the piping edge device 65 (see FIG. 10).

The piping edge device 65 includes the front piping edge 66 (see FIG. 8, FIG. 10) and the rear piping edge.

Returning to FIG. 8, FIG. 10, the front piping edge 66 has an upper piping edge section 67 that covers the front edge 52c of the sheet 52 from an upper position, a lower piping edge section 68 that covers the front half (including the front end 77b) of the front bond portion 77 in the vehicle cabin 71, and a front piping edge section 69 that connects the front ends of the upper piping edge section 67 and the lower piping edge section 68.

Similarly to the front connection portion 62 and the sheet 52, the front piping edge 66 is composed of awning cloth having flexibility.

A rear piping edge (not illustrated) is a member substantially symmetrical to the front piping edge 66 in a fore-and-aft direction, and thus detailed description of the rear piping edge is omitted in the following.

Also, the connection device 61 (that is, the connection bag 79 of the front connection portion 62 and the connection bag (not illustrated) of the rear connection portion) houses the press device 56.

The press device 56 includes the front wire member 85 (wire member) housed in the connection bag 79 of the front connection portion 62, and a rear wire member (wire member) (not illustrated) housed in the connection bag of the rear connection portion.

As illustrated in FIG. 6, FIG. 9, the front wire member 85 includes a main wire 86 having a uniform section, a left cylinder member 87 and a right cylinder member 88 both having a larger diameter than the main wire 86, a pair of fixed members 89 provided on both end sides of the left cylinder member 87, and a pair of fixed members 91 provided on both end sides of the right cylinder member 88.

The right cylinder member 88 and the right-side fixed members 91 are each a member substantially symmetrical to the left cylinder member 87 and the left-side fixed members 89 in a crosswise direction, and thus detailed description of the right cylinder member 88 and the right-side fixed member 91 is omitted in the following.

The main wire 86 is bridged between the left side rail 51 and the right side rail 51 and is inserted in the inside 82 of the connection bag 79. Similarly to a normally used typical wire, the main wire 86 has a uniform section and is composed of a material allowing elastic deformation. Therefore, a normally used typical wire may be utilized as the main wire 86.

When the front reinforcement member 54 (that is, the soft top 30) is folded in a curl shape, the main wire 86 may be bent in a curl shape along with the front reinforcement member 54.

The left cylinder member 87 is disposed at a spaced-apart position 86a of the main wire 86. The spaced-apart position 86a is the position inward from the left side rail 51 by distance L1.

That is, the main wire 86 has the spaced-apart position 86a which is spaced apart inward from the left side rail 51 by distance L1, and another area 86b other than the spaced-apart position 86a. Hereinafter, "the other area 86b of the main wire 86" is described as "minor diameter portion 86b".

The left cylinder member 87 is cylindrically formed of an elastic member so as to have a larger diameter than the main wire 86, and a through hole 92 is formed along the axis. The left cylinder member 87 constitutes a major diameter portion of the front wire member 85.

Hereinafter, "the left cylinder member 87" is described as "the major diameter 87".

The through hole 92 of the major diameter portion 87 has an inner diameter which is larger than the outer diameter of the main wire 86. Therefore, the major diameter portion 87 is held to be movable relative to the main wire 86 with the main wire 86 inserted in the through hole 92.

The pair of fixed members 89 is caulked to be unmovable (that is, in a fixed state) relative to the main wire 86 near both ends 87a, 87b of the major diameter portion 87 of the main wires 86. The pair of fixed members 89 is fixed such that the fixed member 89 inward in a vehicle width direction is contactable with the inner end 87a of the major diameter portion 87, and the fixed member 89 outward in a vehicle width direction is contactable with the outer end 87b of the major diameter portion 87. Thus, the major diameter portion 87 is held to be disposed at the spaced-apart position 86a by the pair of fixed members 89.

The pair of fixed members 89 is formed such that its length dimension along the main wire 86 is smaller than the length dimension of the major diameter portion 87 along the main wire 86.

Here, the major diameter portion 87 (that is, the front wire member 85) is housed in the connection bag 79. As described above, the connection bag 79 is disposed at a position vertically overlapping with the front ends 58a of the reinforcement bars 58. Therefore, by disposing the major diameter portion 87 at the spaced-apart position 86a, the major diameter portion 87 is regulated at a desired mounting position (that is, a position below the front end 58a of the left reinforcement bar 58).

The left reinforcement bar 58 is a member having high stiffness. By disposing the major diameter portion 87 at a position under the front end 58a of the left reinforcement bar 58, it is possible to efficiently transmit a downward pressing force by the major diameter portion 87 to the front end 58a with a base 79c of the connection bag 79 pressed by the major diameter portion 87.

Therefore, the downward pressing force by the major diameter portion 87 enables the left reinforcement bar 58 to be reliably pressed toward the roof opening 23. Consequently, it is possible to protect the soft top 30 from floating and improve the stability of the soft top 30.

Also, by disposing the major diameter portion 87 at a position below the front end 58a of the left reinforcement bar 58, the major diameter portion 87 and the front end 58a of the left reinforcement bar 58 are collectively provided at the same position.

This ensures an easily bendable large area of the soft top 30, other than the reinforcement bars 58 and thus it is possible to fold the soft top 30 compactly.

Also, the pair of fixed members 89 is mounted on the minor diameter portion 86b so that distance L2 between the pair of fixed members 89 is longer than the length L3 of the major diameter portion 87. Therefore, it is possible to move the major diameter portion 87 relative to the main wire 86 between the pair of fixed members 89.

Consequently, extension of the major diameter portion 87 due to thermal expansion is not blocked by the pair of fixed members 89 (that is, the extension is allowed).

In addition, by setting the distance L2 between the pair of fixed members 89 longer than the length L3 of the major diameter portion 87, elastic deformation of the major diameter portion 87 is not restricted by the pair of fixed members 89 (that is, the elastic deformation is allowed).

This improves the flexibility of the front wire member 85, and thus it is possible to fold the soft top 30 easily.

As described above, the front wire member 85 includes the main wire 86, the left cylinder member 87, the right cylinder member 88, and the plural fixed members 89, and the left cylinder member 87 and the right cylinder member 88 form the major diameter portion 87. Thus, similarly to a typical wire, it is possible to ensure a uniform section of the main wire 86. That is, a normally used typical wire may be utilized as the main wire 86.

This allows the front wire member 85 to be easily formed, and thus productivity of the front wire member 85 is improved.

As illustrated in FIG. 9, FIG. 10, the main wire 86 is extended in the direction of arrow A-A (vehicle width direction) with the front wire member 85 housed in the inside 82 of the connection bag part 79. In this state, the main wire 86, the major diameter portion 87, and the pair of fixed members 89 are above and in contact with the base 79c of the connection bag 79.

That is, the front wire member 85 is connected to the front reinforcement member 54 and the front portion 52e of the sheet 52 via the connection bag 79.

A left end 86c of the main wire 86 is mounted on the front end of the left side rail 51, and a right end 86d of the main wire 86 is mounted on the front end of the right side rail 51.

A turn buckle for tension adjustment (not illustrated) is connected to one of the left end 86c and the right end 86d of the main wire 86. The tension of the front wire member 85 is preferably adjusted by operating the turn buckle.

Thus, the main wire 86, the major diameter portion 87, and the pair of fixed members 89 are above and in contact with the base 79c of the connection bag 79 with the tension of the main wire 86 adjusted.

As illustrated in FIG. 6, FIG. 8, application of the tension of the main wire 86 to the base 79c of the connection bag 79 causes the downward pressing force F3 to be applied to the base 79c of the connection bag 79 due to the main wire 86, the major diameter portion 87, and the pair of fixed members 89 (that is, the front wire member 85).

Application of the pressing force F3 causes the front portion 52e of the sheet 52 along with the front reinforcement member 54 to be pressed downward (the vehicle cabin 71) toward the front seal member 27 via the front wire member 85.

Thus, the lower surface 54f of the front end 54a of the front reinforcement member 54 is brought into contact with the upper portion 35a of the first seal unit 35 and the upper surface 36a of the first stopper unit 36 from an upper rear position via a lower piping edge section 68 of the front piping edge 66.

In other words, the front edge 31a of the soft top 30 (specifically, the front press end 31) is brought into contact with the upper portion 35a of the first seal unit 35 and the upper surface 36a of the first stopper unit 36 from an upper rear position. The upper surface 36a of the first stopper unit 36 is formed flat along the front edge 31a (for instance, the lower piping edge section 68 of the front piping edge 66, and the front end 54a of the front reinforcement member 54) of the front press end 31.

In addition, the lower surface 54f of the rear end 54b of the front reinforcement member 54 is brought into contact with the upper portion 38a of the second seal unit 38 and the upper surface 39a of the second stopper unit 39 from an upper position via the rear bond portion 78.

In other words, the front press end 31 of the soft top 30 is brought into contact with the upper portion 38a of the second seal unit 38 and the upper surface 39a of the second stopper unit 39 from an upper position. The upper surface 39a of the second stopper unit 39 is formed flat along the front press end 31 (for instance, the rear bond portion 78 of the front connection portion 62 and the rear end 54b of the front reinforcement member 54).

Here, the upper portion 35a of the first seal unit 35 is positioned upwardly of the upper surface 36a of the first stopper unit 36 (see FIG. 7). Therefore, the upper portion 35a of the first seal unit 35 is pressed downward and deformed by the front edge 31a (specifically, the lower piping edge section 68 of the front piping edge 66) of the front press end 31. Consequently, sealing between the front edge 31a (that is, the front end 54a of the front reinforcement member 54) of the front press end 31 and the first seal unit 35 is maintained.

In this state, the front end 54a of the front reinforcement member 54 is above and in contact with the upper surface 36a of the first stopper unit 36 via the lower piping edge section 68 of the front piping edge 66. That is, the front edge 31a of the front press end 31 is above and in contact with the upper surface 36a of the first stopper unit 36.

In addition, the upper portion 38a of the second seal unit 38 is positioned upwardly of the upper surface 39a of the second stopper unit 39 (see FIG. 7). Therefore, the upper portion 38a of the second seal unit 38 is pressed downward and deformed by the front press end 31 (the rear bond portion 78). Consequently, sealing between the front press end 31 (that is, the rear end 54b of the front reinforcement member 54) and the second seal unit 38 is maintained.

In this state, the rear end 54b of the front reinforcement member 54 is above and in contact with the upper surface 39a of the second stopper unit 39 via the rear bond portion 78. That is, the front press end 31 is above and in contact with the upper surface 39a of the second stopper unit 39.

Here, the upper surface 36a of the first stopper unit 36 and the upper surface 39a of the second stopper unit 39 are formed flat facing upward along the front end 54a and the rear end 54b (that is, the front press end 31) of the front reinforcement member 54.

Thus, the front reinforcement member 54 is horizontally supported by the upper surface 36a of the first stopper unit 36 and the upper surface 39a of the second stopper unit 39. Consequently, the upper portion 35a of the first seal unit 35 and the upper portion 38a of the second seal unit 38 are pressed down substantially uniformly.

That is, it is possible to protect the front reinforcement member 54 from inclining with respect to a horizontal direction due to significant deformation of only one of the first seal unit 35 and the second seal unit 38. Thus, uneven application of the pressing force of the front reinforcement member 54 to the first seal unit 35 and the second seal unit 38 is avoided.

In this state, sealing between the front end 54a of the front reinforcement member 54 and the first seal unit 35 is secured, and sealing between the rear end 54b of the front reinforcement member 54 and the second seal unit 38 is secured.

Also, the front wire member 85 is provided in a space 96 between the first seal device 34 and the second seal device 37 in a horizontal direction (direction of arrow B-B) perpendicular to the extension direction (direction of arrow A-A) of the front wire member 85. That is, the front wire member 85 is provided between the first stopper unit 36 and the second stopper unit 39. Therefore, the pressing force F3 of the front wire member 85 is applied from the front reinforcement member 54 to the first seal device 34 and the second seal device 37 as a downward pressing force.

Also, the front wire member 85 is provided between the first seal device 34 and the second seal device 37, and thus the distance dimension between the first seal device 34 and the front wire member 85 and the distance dimension between the second seal device 37 and the front wire member 85 are restricted to be small.

Consequently, the pressing force F3 of the front wire member 85 is efficiently transmitted from the front reinforcement member 54 to both the first seal device 34 (the first seal unit 35, the first stopper unit 36) and the second seal device 37 (the second seal unit 38, the second stopper unit 39).

On the other hand, for comparison purpose, when disposed position of the front wire member 85 is determined, it may be possible that for instance, the front wire member 85 is provided outwardly of one of the first stopper unit 36 and the second stopper unit 39 (specifically, outwardly of one of the stopper portions in a fore-and-aft direction of the vehicle body). In this case, the pressing force of the front wire member 85 is applied to the front reinforcement member 54 outwardly of the one stopper portion.

That is, the pressing force of the front wire member 85 is applied to the front reinforcement member 54 as a rotational force that rotates the front reinforcement member 54 in a direction away from the other stopper portion with the one stopper portion as a fulcrum (rotational center). For this reason, it is difficult to favorably maintain the pressing force of the front reinforcement member 54 to the other stopper portion.

Thus, as described above, a configuration is adopted such that the front wire member 85 is provided between the first stopper unit 36 and the second stopper unit 39. Consequently, it is possible to efficiently transmit the pressing force F3 of the front wire member 85 from the front reinforcement member 54 to both the first seal device 34 (the first seal unit 35, the first stopper unit 36) and the second seal device 37 (the second seal unit 38, the second stopper unit 39).

Also, the front wire member 85 is connected to substantially the middle position 54g of the front reinforcement member 54 via the connection bag 79. Therefore, the pressing force F3 of the front wire member 85 is transmitted to substantially the middle position 54g of the front reinforcement member 54, and the transmitted pressing force F3 is substantially uniformly applied to the front end 54a and the rear end 54b of the front reinforcement member 54.

Consequently, the pressing force F1 of the front end 54a to the first seal device 34 (particularly, the first seal unit 35), and the pressing force F2 of the rear end 54b of the second seal device 37 (particularly, the second seal unit 38) are ensured substantially uniformly. In other words, the pressing forces F1, F2 of the front reinforcement member 54 to both the first seal unit 35 and the second seal unit 38 are ensured substantially uniformly.

With the soft top 30 mounted on the roof opening 23 (see FIG. 1), the soft top 30 (that is, the front reinforcement member 54) may move in a horizontal direction (for instance, a fore-and-aft direction of the vehicle body (direction of arrow B-B) or a vehicle width direction (direction of arrow A-A)).

Thus, the front reinforcement member 54 is designed to be brought into contact with both the first seal device 34 and the second seal device 37 from an upper position. Furthermore, the front wire member 85 is connected to the front reinforcement member 54 so that the front press end 31 of the soft top 30 along with the front reinforcement member 54 is pressed down by the pressing force F3 of the front wire member 85.

Therefore, even when the soft top 30 (that is, the front reinforcement member 54) moves in a horizontal direction, the front end 54a of the front reinforcement member 54 is maintained to be favorably in contact with the first seal device 34 (the first seal unit 35). Similarly, the rear end 54b of the front reinforcement member 54 is maintained to be favorably in contact with the second seal device 37 (the second seal unit 38). That is, the front end 54a and the rear end 54b of the front reinforcement member 54 are maintained to be favorably in contact with both the first seal unit 35 and the second seal unit 38.

Consequently, the pressing force F1, F2 of the front reinforcement member 54 to the first seal unit 35 and the second seal unit 38 are favorably maintained, and thus improved sealing of the soft top 30 with respect to the first seal unit 35 and the second seal unit 38 is maintained.

Also, the upper surface 36a of the first stopper unit 36 of the first seal device 34 is formed flat, and the upper surface 39a of the second stopper unit 39 of the second seal device 37 is formed flat. Consequently, even when the soft top 30 (that is, the front reinforcement member 54) moves in a horizontal direction, it is possible to stably support the front reinforcement member 54.

Figure 11:
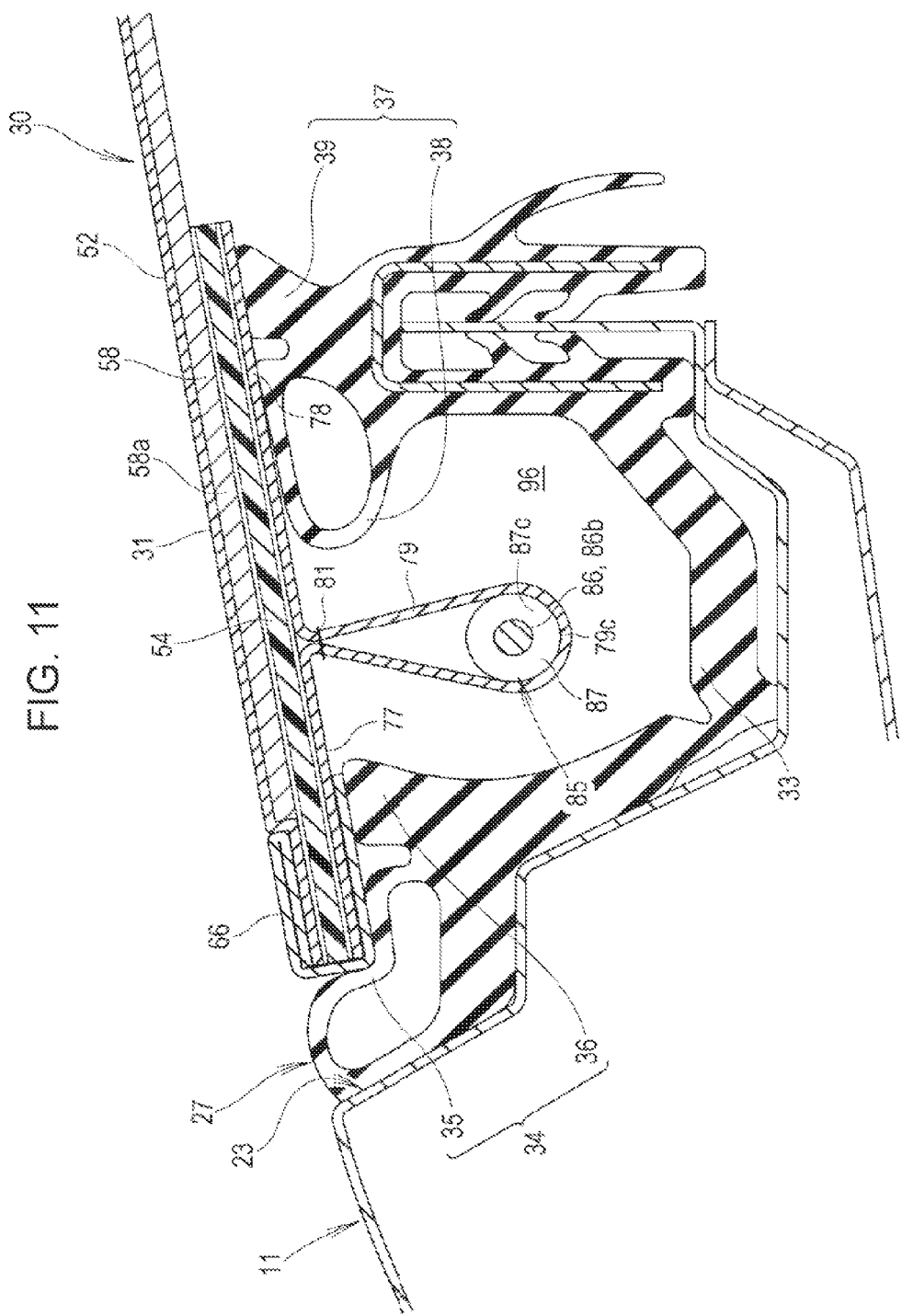
FIG. 11 is a sectional view taken along line XI-XI of FIG. 1 where the line XI-XI is in the left-side vicinity of a major diameter portion.

As illustrated in FIG. 9, FIG. 11, the major diameter portion 87 is provided in the front wire member 85 at the spaced-apart position 86a spaced apart from the left side rail 51. The major diameter portion 87 is formed to have a larger diameter than the minor diameter portion 86b (see FIG. 6). Therefore, the major diameter portion 87 significantly projects downward more than the minor diameter portion 86b with the soft top 30 mounted on the vehicle body 11, and the major diameter portion 87 is firmly pressed against the base 79c of the connection bag 79.

Firm press on the major diameter portion 87 causes the front press end 31 of the soft top 30 to be favorably pressed down by the front wire member 85 (particularly, the major diameter portion 87). This causes the front press end 31 of the soft top 30 to be favorably pressed against the front seal member 27 of the roof opening 23, and thus sealing of the front press end 31 with respect to the front seal member 27 is favorably maintained.

Also, the major diameter portion 87 is formed to be elastically deformable. Thus, the major diameter portion 87 (particularly, the lower end 87c of the major diameter portion 87) is elastically deformed so as to be compressed with the minor diameter portion 86b in contact with the base 79c of the connection bag 79. In this state, the lower end 87c is in contact with the base 79c of the connection bag 79. Consequently, the elastic force of the major diameter portion 87 (that is, restoring force in a compressed state) in addition to the pressing force of the main wire 86 causes the base 79c of the connection bag 79 to be pressed down. Therefore, the base 79c of the connection bag 79 is pressed down by a large force, and thus sealing of the front press end 31 with respect to the front seal member 27 is further favorably maintained.

Here, the major diameter portion 87 is provided in the front wire member 85 only at the spaced-apart position 86a spaced apart from the left side rail 51. Therefore, the front wire member 85 excluding the major diameter portion 87 is formed as the minor diameter portion 86b. The minor diameter portion 86b is a wire portion having a smaller diameter than the major diameter portion 87 and is easily formed in a curl shape.

Thus, work of bending the front wire member 85 in a curl shape is made easy, and the soft top 30 may be easily folded.

In addition, since the major diameter portion 87 is formed of an elastic member, the major diameter portion 87 is formed to be elastically deformable. Therefore, because of elastic deformation of the major diameter portion 87, difficulty in bending the front wire member 85 may be reduced. Consequently, when the soft top 30 is folded, difficulty in forming the front wire member 85 in a curl shape may be reduced.

In addition, the major diameter portion 87 is held to be movable relative to the main wire 86. Therefore, when the major diameter portion 87 is elastically deformed, the elastic deformation of the major diameter portion 87 is not restricted by the main wire 86.

Consequently, bending flexibility of the front wire member 85 is improved, and thus it is possible to fold the soft top 30 easily.

A rear wire members (not illustrated) is a member similar to the front wire member 85, and detailed description of the rear wire member is omitted in the following.

The rear portion 52*f* of the sheet 52 along with the rear reinforcement member 55 illustrated in FIG. 3 is pressed downward (the vehicle cabin 71 (see FIG. 8)) toward the rear seal member by the rear wire member.

Therefore, by providing the right and left side rails 51 in the roof opening 23, the front edge 52*c* of the sheet 52 is disposed along the front opening edge 24 and the rear edge 52*d* of the sheet 52 is disposed along the rear opening edge 25.

Next, an example will be described with reference to FIG. 12, in which sealing between the front seal member 27 and the soft top 30 is secured by the first stopper unit 36 and the second stopper unit 39.

Figure 12:
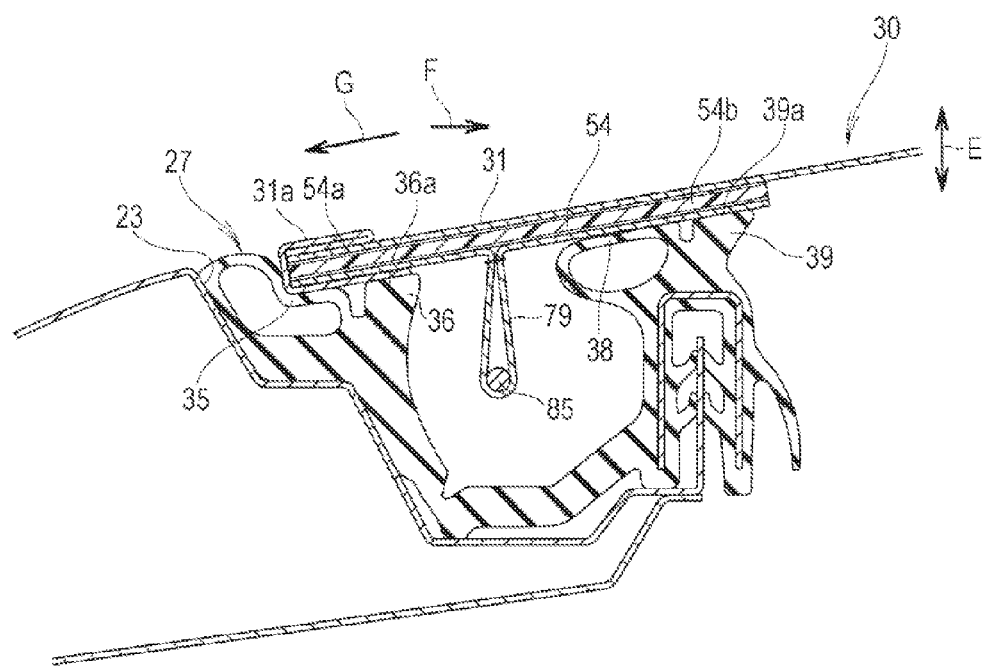
FIG. 12 is an explanatory illustration of an example in which sealing between the front seal member and the soft top according to the present disclosure is secured by a first stopper unit and a second stopper unit.

As illustrated in FIG. 12, in the soft top 30, the sheet 52 is composed of awning cloth having flexibility. Thus, flexure may occur as indicated by arrow E in a central portion of the soft top 30 in a fore-and-aft direction of the vehicle body.

When flexure occurs in the soft top 30, the front press end 31 of the soft top 30 is pulled toward (the inner side of the roof opening 23) the rear of the vehicle body as indicated by arrow F.

Thus, the second stopper unit 39 is disposed at a higher position than the first stopper unit 36, and the upper surface 36*a* of the first stopper unit 36 and the upper surface 39*a* of the second stopper unit 39 are inclined downward toward the outside (that is, forward in the vehicle body) of the roof opening 23.

Therefore, due to the weight of the soft top 30 itself and the downward tension of the front wire member 85, it is possible to move the front edge 31*a* of the front press end 31 to the first seal unit 35 as indicated by arrow G. This enables the front press end 31 to be retained at a predetermined mounting position against the tensile force that occurs at the front press end 31 of the soft top 30 in the direction of arrow F. Therefore, it is possible to secure sealing between the first seal unit 35 and the front edge 31*a* of the front press end 31.

When the soft top 30 is replaced by a high rigid roof glass or a metal panel, the degree of flexure that occurs in a central portion of the soft top 30 in a fore-and-aft direction of the vehicle body is restricted to be small. Therefore, it is possible to secure the sealing between the first seal unit 35 and the front edge 31*a* without disposing the second stopper unit 39 at a higher position than the first stopper unit 36 and inclining the upper surface 36*a* of the first stopper unit 36 and the upper surface 39*a* of the second stopper unit 39.

Also, the front press end 31 is stably supported by contact of the front press end 31 with both the upper surface 36*a* of the first stopper unit 36 and the upper surface 39*a* of the second stopper unit 39. Thus, the front press end 31 is protected from being displaced in a vertically inclined manner.

In addition, the front press end 31 is supported by the first stopper unit 36 adjacent to the first seal unit 35 and the second stopper unit 39 adjacent to the second seal unit 38. Therefore, occurrence of vertical flexure of the front press end 31 is protected in the first seal unit 35 and the second seal unit 38.

By protecting against the inclination and flexure of the front press end 31 in this manner, it is possible to secure sealing between the first seal unit 35 and the front edge 31*a* of the front press end 31 and to secure sealing between the second seal unit 38 and the front press end 31.

Next, an example will be described with reference to FIGS. 13A and 13B, in which sealing between the front seal member 27 and the soft top 30 is secured by the front reinforcement member 54.

Figure 13A:
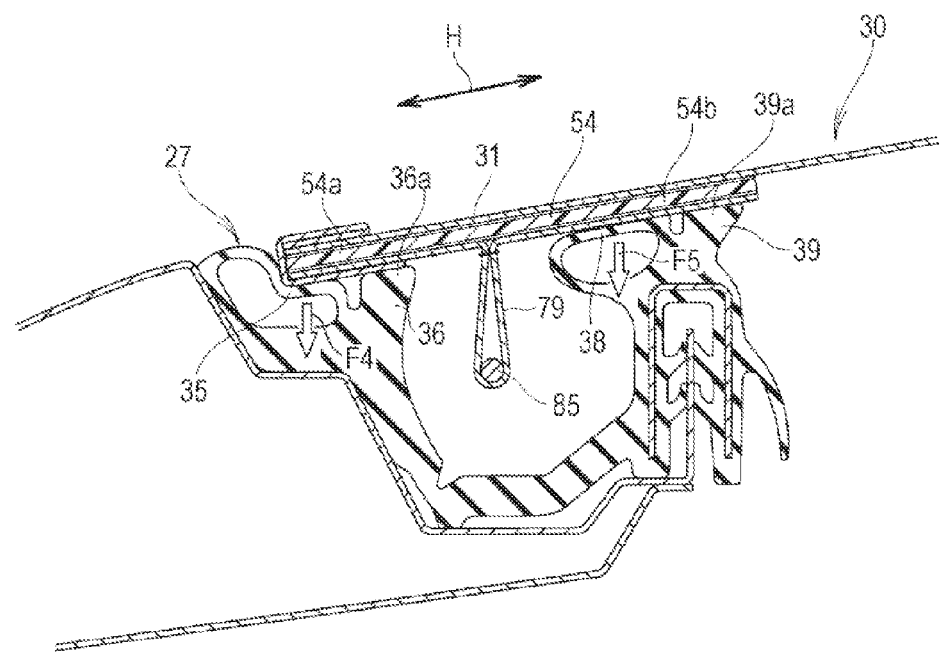
FIGS. 13A and 13B are each an explanatory illustration of an example in which sealing between the front seal member and the soft top according to the embodiment of the present disclosure is secured by a front reinforcement member.

As illustrated in FIG. 13A, the front reinforcement member 54 is supported in a horizontal direction on the upper surface 36*a* of the first stopper unit 36 and the upper surface 39*a* of the second stopper unit 39. Consequently, sealing between the front end 54*a* of the front reinforcement member 54 and the first seal unit 35 is secured, and sealing between the rear end 54*b* of the front reinforcement member 54 and the second seal unit 38 is secured.

Also, the front reinforcement member 54 is supported by each of the upper surfaces 36*a* and 39*a*, and thus is above and in contact with the first seal unit 35 and the second seal unit 38 with the front reinforcement member 54 maintained horizontally.

Thus, even when the soft top 30 moves in a horizontal direction (for instance, fore-and-aft direction of the vehicle body (direction of arrow H) or vehicle width direction), the front reinforcement member 54 is maintained to be supported in a horizontal direction.

This enables pressing force F4 to be favorably maintained, the pressing force F4 being applied from the front end 54*a* of the front reinforcement member 54 to the first seal unit 35. Similarly, it is possible to favorably maintain pressing force F5 that is applied from the rear end 54*b* of the front reinforcement member 54 to the second seal unit 38.

Therefore, the sealing between the front seal member 27 and the front press end 31 of the soft top 30 is favorably maintained, and sealing between the front opening edge 24 and the front press end 31 is thereby favorably maintained.

Figure 13B:
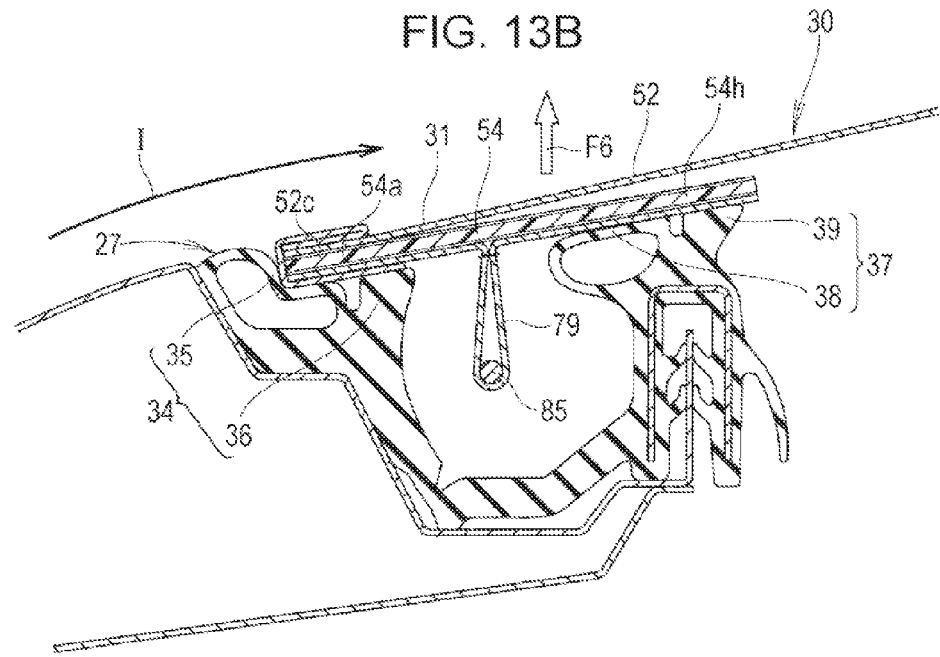

As illustrated in FIG. 13B, negative pressure occurs above the soft top 30 due to air flow as indicated by arrow I during running of a vehicle, and thus upward lifting force F6 is applied to the soft top 30.

Here, only the front edge 52*c* of the sheet 52 is bonded to (sewed on) the front end 54*a* of the front reinforcement member 54, and the sheet 52 is not bonded to (sewed on) other area (area rearward of the front end 54*a*) 54*h* of the front reinforcement member 54.

Therefore, when the lifting force F6 is applied to the soft top 30, the sheet 52 may be separated (escaped) upward from the other area 54*h* of the front reinforcement member 54. This favorably protects the front reinforcement member 54 from being pushed upward from the front seal member 27 (that is, the first seal device 34 and the second seal device 37) due to the lifting force F6.

Therefore, even when the lifting force F6 is applied to the soft top 30 due to running air, the sealing between the front seal member 27 and the front press end 31 of the soft top 30 is favorably maintained, and sealing between the front opening edge 24 and the front press end 31 is thereby favorably maintained.

Next, an example will be described with reference to FIG. 14, in which the soft top 30 is pressed down by the major diameter portion 87 of the front wire member 85.

Figure 14:
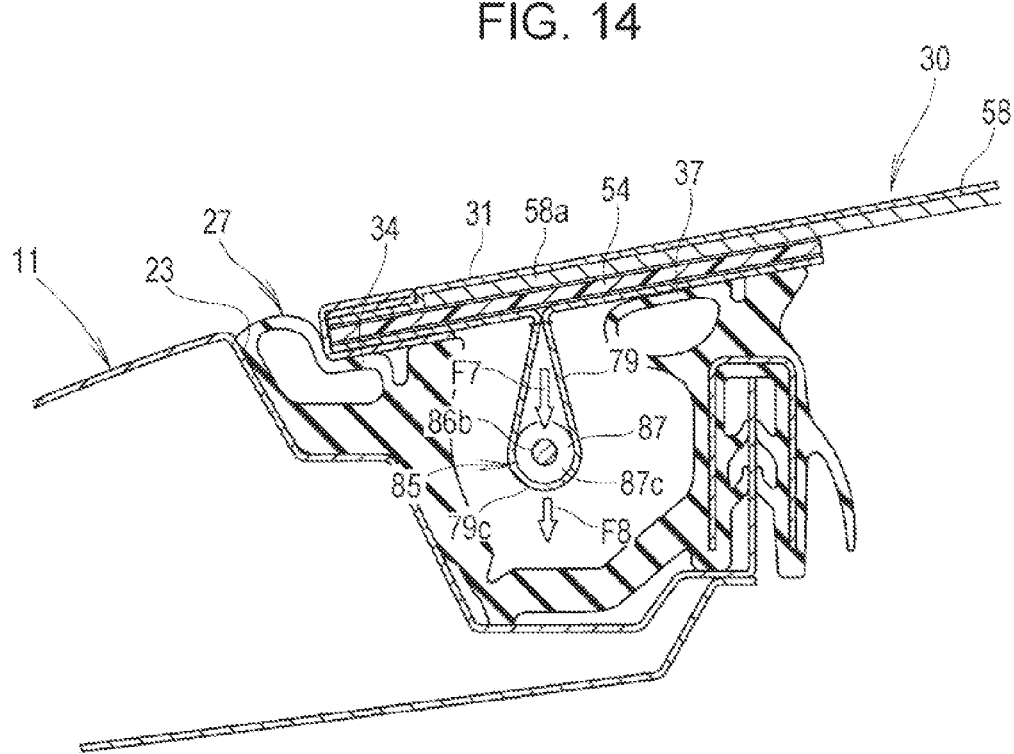
FIG. 14 is an explanatory illustration of an example in which the soft top is pressed down by a major diameter portion of a front wire member according to the embodiment of the present disclosure.

As illustrated in FIG. 14, the major diameter portion 87 of the front wire member 85 significantly projects downward more than the minor diameter portion 86*b* with the soft top 30 mounted on the vehicle body 11. Therefore, it is possible to favorably press down the front press end 31 of the soft top 30 by firming pressing the major diameter portion 87 to the base 79*c* of the connection bag 79.

Also, it is possible to elastically deform the major diameter portion 87 (particularly, the lower end 87c of the major diameter portion 87) so as to be compressed with the minor diameter portion 86b in contact with the base 79c of the connection bag 79. In this state, the lower end 87c is in contact with the base 79c of the connection bag 79. Therefore, it is possible to press down the base 79c of the connection bag 79 by elastic force F8 (that is, restoring force in a compressed state) of the major diameter portion 87 in addition to pressing force F7 of the main wire 86.

This enables the front press end 31 of the soft top 30 to be favorably pressed down.

Furthermore, the major diameter portion 87 is disposed at a position below the front end 58a of the left reinforcement bar 58. Therefore, the major diameter portion 87 is able to receive downward pressing force by the front end 58a of the left reinforcement bar 58.

The left reinforcement bar 58 is a member having high stiffness. Thus, the front end 58a of the left reinforcement bar 58, after receiving the pressing force of the major diameter portion 87, is able to transmit the pressing force to the front press end 31 of the soft top 30 efficiently.

In this manner, it is possible to protect the soft top 30 from separating from the front seal member 27 of the roof opening 23 by favorably pressing down the front press end 31 of the soft top 30 during running of a vehicle.

This enables sealing of the soft top 30 with respect to the front seal member 27 to be secured.

Next, an example will be described with reference to FIGS. 2, 15A, 15B, 16, in which the soft top 30 is folded into a small size. In FIG. 15B, in order to facilitate understanding of the configuration, only the right-side major diameter portion 87 will be described and description of the left-side major diameter portion 87 is omitted.

As illustrated in FIG. 2, the soft top 30 is detached from the roof opening 23 of the vehicle body structure 10 having a detachable roof.

Figure 15A:
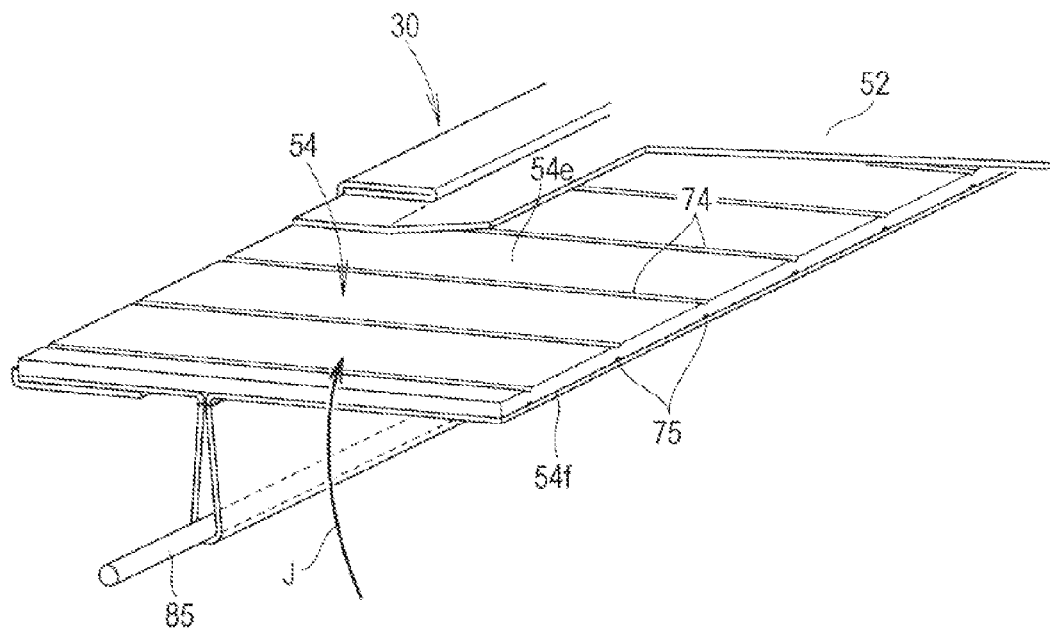
FIGS. 15A and 15B are each an explanatory illustration of an example in which the soft top according to the embodiment of the present disclosure is folded in a curl shape from the right and left side rails.
Figure 15B:
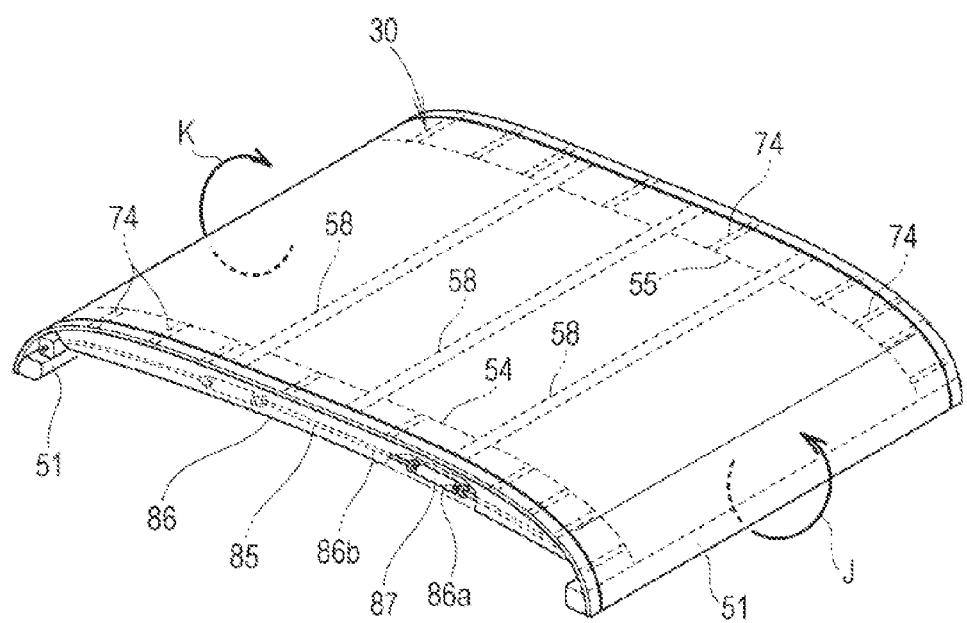

As illustrated in FIG. 15A, the front reinforcement member 54 is bent along the upper grooves 74 and the lower grooves 75, and is folded in a curl shape as indicated by arrow J with the soft top 30 detached from the roof opening 23 (see FIG. 2).

At the same time, similarly to the front reinforcement member 54, the rear reinforcement member 55 (see FIG. 15B) is folded in a curl shape as indicated by arrow J (see FIG. 15B).

As illustrated in FIG. 15B, the front reinforcement member 54 and the rear reinforcement member 55 are folded in a curl shape from the left side, and the soft top 30 is thereby folded from the left side rail 51 in a curl shape as indicated by arrow J.

Similarly, the front reinforcement member 54 and the rear reinforcement member 55 are folded in a curl shape from the right side, and the soft top 30 is thereby folded from the right side rail 51 in a curl shape as indicated by arrow K.

The soft top 30 is folded from the right and left side rails 51 in a curl shape, and the front wire member 85 (see FIGS. 13A and 13B) and the rear wire member are thereby bent in a curl shape along with the soft top 30.

Here, the major diameter portion 87 is provided in the front wire member 85 only at the spaced-apart position 86a spaced apart from the left side rail 51, and thus the front wire member 85 excluding the major diameter portion 87 is formed as the minor diameter portion 86b. The minor diameter portion 86b is an area (that is, a wire) having a smaller diameter than the major diameter portion 87 and is easily formed in a curl shape.

In addition, since the major diameter portion 87 is formed of an elastic member, the major diameter portion 87 is formed to be elastically deformable. Therefore, because of elastic deformation of the major diameter portion 87, difficulty in bending the front wire member 85 may be reduced and the front wire member 85 may be easily formed in a curl shape.

In addition, the major diameter portion 87 is held to be movable relative to the main wire 86. Therefore, when the major diameter portion 87 is elastically deformed, the elastic deformation of the major diameter portion 87 is not restricted by the main wire 86 and the front wire member 85 may be easily formed in a curl shape. Since the front wire member 85 may be easily formed in a curl shape in this manner, work of bending the front wire member 85 in a curl shape is made easy, and the soft top 30 may be easily folded.

The soft top 30 is provided with plural reinforcement bars 58. Consequently, when the soft top 30 is folded, each of areas provided with the reinforcement bars 58 may be difficult to be folded.

Thus, the major diameter portion 87 and the front end 58a of the left reinforcement bar 58 are collectively provided at the vertically same positions. Thus, it is possible to ensure a large area other than the reinforcement bars 58, that is, an easily bendable large area. This enables the soft top 30 to be folded compactly, and easiness of storing the soft top 30 is improved.

In addition, neither the front reinforcement member 54 nor the rear reinforcement member 55 is provided near the right and left side rails 51. Consequently, the soft top 30 is easily formed in a curl shape, and thus it is possible to fold the soft top 30 easily.

Here, when the soft top 30 is folded in a curl shape, the front wire member 85 (see FIGS. 13A and 13B) is outward of the front reinforcement member 54 with respect to the curl shape, and the rear wire member is outward of the rear reinforcement member 55 with respect to the curl shape. In addition, the front wire member 85 is formed to have substantially the same length as the front reinforcement member 54, and the rear wire member is formed to have substantially the same length as the rear reinforcement member 55.

Therefore, when the soft top 30 is folded in a curl shape, the outer sides (radially outer sides) of the front reinforcement member 54 and the rear reinforcement member 55 are regulated by the front wire member 85 and the rear wire member, and the front reinforcement member 54 and the rear reinforcement member 55 are bent so as to sag inwardly.

After the front reinforcement member 54 and the rear reinforcement member 55 sag inwardly, the soft top 30 is further rolled, and the front reinforcement member 54 and the rear reinforcement member 55 are bent (folded) outwardly toward the front wire member 85 and the rear wire member.

Thus, the upper grooves 74 and the lower grooves 75 are formed in the front reinforcement member 54, and the upper grooves 74 and the lower grooves 75 are further formed in the rear reinforcement member 55.

Thus, the inward sag and outward bending of the front reinforcement member 54 and the rear reinforcement member 55 become smooth, and the soft top 30 is further easily formed in a curl shape, and it is possible to fold the soft top 30 further easily.

Figure 16:
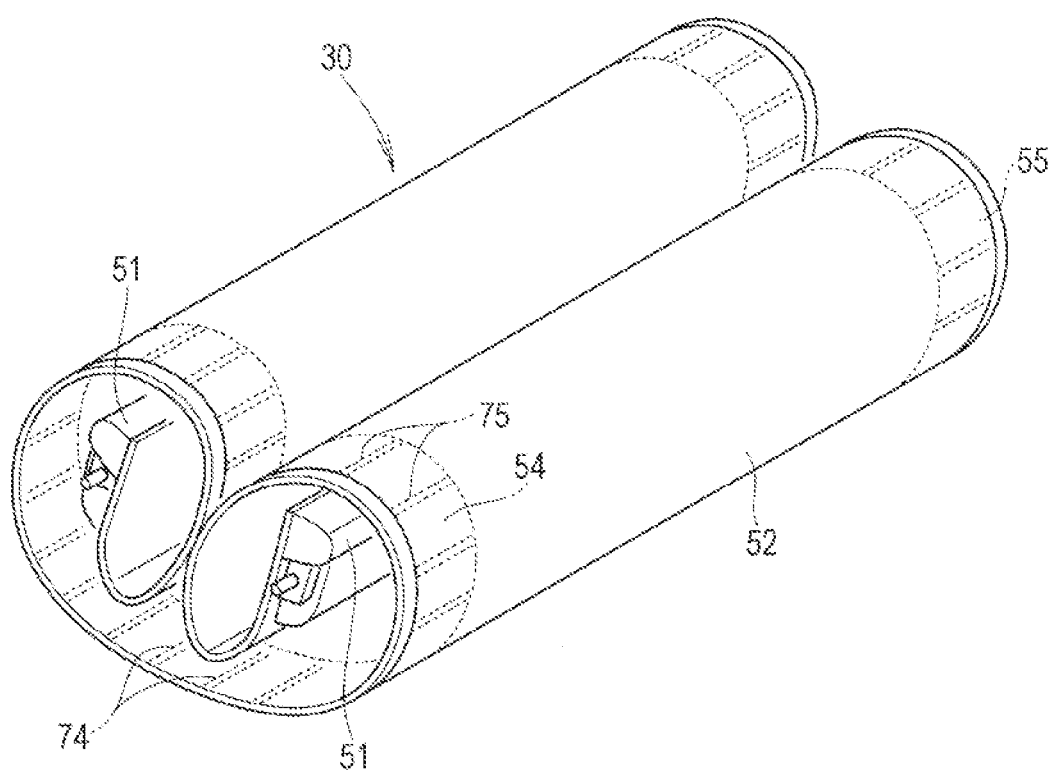
FIG. 16 is an explanatory illustration of a state in which the soft top according to the present disclosure is folded.

As illustrated in FIG. 16, the soft top 30 is folded from the right and left side rails 51 in a curl shape, and the soft top 30 is thereby folded into a small size. Consequently, it is possible to easily store the folded soft top 30 into a storage of the vehicle body.

In addition, folding the soft top 30 into a small size allows the storage space for the folded soft top 30 to be reduced.

Returning to FIG. 15A, the upper grooves 74 are provided in the upper surface 54e of the front reinforcement member 54, and the lower grooves 75 are provided in the lower surface 54f of the front reinforcement member 54. Therefore, the front reinforcement member 54 are bendable along the upper grooves 74 and the lower grooves 75 in both of the direction of arrow J and the opposite direction to the direction of arrow J (that is, upper direction, lower direction). This allows workability of folding the soft top 30 into a small size to be improved.

The vehicle body structure having a detachable roof according to the present disclosure is not limited to the embodiment described above, and modification, improvement may be made as needed.

For instance, in the above-described embodiment, an example has been described, in which component members such as the sheet 52, the front reinforcement member 54, the rear reinforcement member 55, the front connection portion 62, and the rear connection portion are sewed and bonded. However, without being limited to this, the component members may be bonded together by another device such as an adhesive or a rivet.

Also, in the above-described embodiment, an example has been described, in which both the upper surface 36a of the first stopper unit 36 and the upper surface 39a of the second stopper unit 39 are inclined downward. However, without being limited to this, at least one of the upper surface 36a of the first stopper unit 36 and the upper surface 39a of the second stopper unit 39 may be inclined downward.

Also, in the above-described embodiment, an example has been described, in which the front opening edge 24 of the roof opening 23 and the front press end 31 of the soft top 30 are formed in a curve shape forward. However, without being limited to this, the front opening edge 24 and the front press end 31 of the soft top 30 may be formed to be substantially linear in a vehicle width direction.

Also, the shapes and configurations such as the vehicle body structure having a detachable roof presented in the embodiment, the vehicle body, the roof opening, the front and rear seal members, the flange, the soft top, the front and rear press ends, the front edge, the first and second seal devices, the first and second seal units, the first and second stopper units, the retainer (the outer wall, the inner wall, the top portion), the sheet, the front and rear reinforcement members, and the front wire member are not limited to what has been exemplified and may be changed as needed.

The present disclosure is preferably applicable to an automobile including a vehicle body structure having a detachable roof, where a roof opening of a vehicle body is detachably provided with a soft top that covers the roof opening. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle body structure having a detachable roof, comprising:
    a roof opening provided in a roof of a vehicle body;
    a soft top that is detachably provided at the roof opening and that covers the roof opening, the soft top including a press end; and
    a seal member that is provided in the roof opening and in contact with the press end of the soft top,
    wherein the seal member includes:
        a first seal member and a second seal member that are disposed spaced apart horizontally from each other and that maintain sealing with respect to the press end of the soft top by being pressed by the press end,
        a first stopper member provided adjacent to the first seal member, and
        a second stopper member provided adjacent to the second seal member,
    wherein the second seal member is disposed more inwardly of the roof opening than the first seal member is, and
    in a condition that sealing is maintained by both the first seal member and the second seal member, the press end of the soft top is in contact with both the first stopper member and the second stopper member.

2. The vehicle body structure having a detachable roof according to claim 1,
    wherein
    the second stopper member is disposed at higher position than the first stopper member.

3. The vehicle body structure having a detachable roof according to claim 2,
    wherein an upper surface of at least one of the first stopper member and the second stopper member is inclined downward toward an outside of the roof opening.

4. The vehicle body structure having a detachable roof according to claim 3,
    wherein the upper surface of the first stopper member and the upper surface of the second stopper member are coplanar.

5. The vehicle body structure having a detachable roof according to claim 1,
    wherein the roof opening has a flange at an inner end thereof, the flange extending in a vertical direction,
    the seal member includes a retainer supported by the flange, and
    the second stopper member is connected to the retainer.

6. The vehicle body structure having a detachable roof according to claim 5,
    wherein the retainer includes:
    an outer wall provided near the first seal member;
    an inner wall provided more inwardly of the roof opening than the outer wall; and
    a top portion that connects an upper end of the outer wall and an upper end of the inner wall and that is connected to the second stopper member, and
    the outer wall, the inner wall, and the top portion are formed in a groove shape that allows the flange to be inserted.

7. The vehicle body structure having a detachable roof according to claim 1,
    wherein the soft top includes:
    a sheet that has flexibility and covers the roof opening; and
    a reinforcement member that is provided at an end of the sheet and is composed of a material having higher stiffness than the sheet, the end of the sheet and the reinforcement member constitute the press end of the soft top, and the reinforcement member is in contact with the first stopper member and the second stopper member.

8. The vehicle body structure having a detachable roof according to claim 7, wherein the soft top includes a wire member that is connected to the reinforcement member and that presses down the reinforcement member, and the wire member is provided between the first stopper member and the second stopper member in a horizontal direction perpendicular to an extension direction of the wire member.

9. The vehicle body structure having a detachable roof according to claim 2, wherein the first seal member has a hollow tube structure deformable by the press end of the soft top.

10. The vehicle body structure having a detachable roof according to claim 3, wherein the upper surface of the second stopper member is inclined downward toward the outside of the roof opening such that the soft top is biased to move toward the outside of the roof opening.

11. The vehicle body structure having a detachable roof according to claim 8, wherein the seal member includes a gap between the first stopper member and the second stopper member, and the wire member is disposed in the gap.

12. The vehicle body structure having a detachable roof according to claim 8, wherein the wire member is coupled to a lower side of the reinforcement member.

13. The vehicle body structure having a detachable roof according to claim 11, wherein the wire member is disposed at a substantial center between the first stopper member and the second stopper member.

14. The vehicle body structure having a detachable roof according to claim 7, wherein the seal member extends along an edge of the roof opening, and the reinforcement member extends along the seal member.

15. The vehicle body structure having a detachable roof according to claim 14, wherein the soft top comprises a reinforcement bar extending in a direction perpendicular to the extending direction of the reinforcement member.

* * * * *